United States Patent
Pineda et al.

(10) Patent No.: US 10,022,019 B2
(45) Date of Patent: Jul. 17, 2018

(54) AUTOMATED FOOD PROCESSING SYSTEM AND METHOD

(71) Applicant: North American Robotics Corporation, San Francisco, CA (US)

(72) Inventors: Elvine Pineda, San Francisco, CA (US); Matthew Udomphol, San Francisco, CA (US); My Vu, San Francisco, CA (US)

(73) Assignee: NORTH AMERICAN ROBOTICS CORPORATION, San Francisco, CA (US)

( * ) Notice: Subject to any disclaimer, the term of this patent is extended or adjusted under 35 U.S.C. 154(b) by 166 days.

(21) Appl. No.: 15/187,396

(22) Filed: Jun. 20, 2016

(65) Prior Publication Data

US 2016/0296073 A1 Oct. 13, 2016

Related U.S. Application Data

(62) Division of application No. 14/808,442, filed on Jul. 24, 2015, now Pat. No. 9,370,279.

(Continued)

(51) Int. Cl.
*A47J 43/07* (2006.01)
*A47J 43/046* (2006.01)
(Continued)

(52) U.S. Cl.
CPC ......... *A47J 43/0716* (2013.01); *A47J 43/046* (2013.01); *B01F 7/0025* (2013.01);
(Continued)

(58) Field of Classification Search
CPC . A47J 43/046; A47J 43/0716; B01F 13/0098; B01F 15/00435;
(Continued)

(56) References Cited

U.S. PATENT DOCUMENTS

| D4,759 S | 4/1871 | Kirchner |
| D52,692 S | 5/1918 | Beiswangeb |

(Continued)

FOREIGN PATENT DOCUMENTS

| DE | 32 08 569 | 9/1983 |
| EP | 1026978 | 1/2003 |

(Continued)

OTHER PUBLICATIONS

Disposable Dessert Cups, available Mar. 21, 2012, [online], [site visited Nov. 10, 2015]. Available from internet, <URL: http://www.mrtakeoutbags.com/product/dessert-dish-pedestal-cups/cdspet8.html.

(Continued)

*Primary Examiner* — Tony G Soohoo
(74) *Attorney, Agent, or Firm* — Shabbi S. Khan; Nikhil T. Pradhan; Foley & Lardner LLP

(57) ABSTRACT

A system for food preparation, including a system body, a blade actuator retained by the system body; a set of blades; a blade platform rotatably mounting the set of blades, the blade platform pivotally connected along a first edge to the system body and operable between an engaged position and a disengaged position; and a container platform defining a container receptacle, the container platform pivotally connected along a first edge to the system body and operable between a loading position and a processing position.

16 Claims, 10 Drawing Sheets

Related U.S. Application Data

(60) Provisional application No. 62/154,466, filed on Apr. 29, 2015, provisional application No. 62/133,674, filed on Mar. 16, 2015, provisional application No. 62/076,188, filed on Nov. 6, 2014, provisional application No. 62/031,076, filed on Jul. 30, 2014.

(51) Int. Cl.
*B01F 7/00* (2006.01)
*B01F 15/00* (2006.01)
*B01F 15/06* (2006.01)
*B01F 13/00* (2006.01)

(52) U.S. Cl.
CPC .... *B01F 13/0098* (2013.01); *B01F 15/00435* (2013.01); *B01F 15/063* (2013.01); *B01F 2015/00597* (2013.01); *B01F 2015/062* (2013.01); *B01F 2215/0014* (2013.01)

(58) Field of Classification Search
CPC ...... B01F 2015/00597; B01F 2015/062; B01F 2215/0014; B01F 7/0025
See application file for complete search history.

(56) References Cited

U.S. PATENT DOCUMENTS

| | | | |
|---|---|---|---|
| 1,969,030 A | 8/1934 | Ernest | |
| 2,232,738 A | 8/1937 | Serr | |
| 2,511,357 A * | 6/1950 | Marty | A47J 43/044 209/251 |
| 3,029,963 A | 4/1962 | Evers | |
| 3,061,279 A * | 10/1962 | Reed | A23G 9/045 187/256 |
| 3,164,378 A * | 1/1965 | Hager | B01F 9/0005 366/226 |
| 3,337,109 A | 8/1967 | Shumrack | |
| D208,829 S | 10/1967 | Stockdale | |
| 3,419,176 A | 12/1968 | Lipfert | |
| 3,505,075 A * | 4/1970 | Black | A23G 9/045 426/318 |
| 3,615,673 A * | 10/1971 | Black | B67D 1/00 141/69 |
| 3,854,705 A | 12/1974 | Shaff | |
| 3,999,742 A * | 12/1976 | Heyraud | B01F 9/0018 366/180.1 |
| 4,042,221 A * | 8/1977 | Myers | B01F 7/161 366/146 |
| D250,929 S | 1/1979 | Gerstman et al. | |
| 4,135,828 A * | 1/1979 | Cabak | B01F 7/162 366/197 |
| 4,247,038 A | 1/1981 | Forbes, Jr. | |
| D264,686 S | 6/1982 | Davis | |
| 4,372,686 A * | 2/1983 | Herfeld | B21F 9/02 366/220 |
| D271,378 S | 11/1983 | Sun | |
| 4,547,076 A * | 10/1985 | Maurer | A23G 9/045 241/283 |
| 4,671,666 A * | 6/1987 | Herfeld | B01F 7/162 366/197 |
| 4,676,658 A * | 6/1987 | Herfeld | B01F 7/162 366/197 |
| 4,681,030 A | 7/1987 | Herbert | |
| 4,883,144 A | 11/1989 | Haushalter et al. | |
| D308,318 S | 6/1990 | Durand | |
| 4,957,373 A * | 9/1990 | Derksen | B01F 7/162 366/197 |
| D317,568 S | 6/1991 | Lane, Sr. | |
| 5,042,197 A | 8/1991 | Pope | |
| 5,054,933 A * | 10/1991 | Derksen | B01F 7/162 251/144 |
| 5,067,819 A * | 11/1991 | Heinhold | B01F 7/1605 134/104.1 |
| 5,150,967 A * | 9/1992 | Neilson | A23G 9/045 366/197 |
| 5,208,050 A * | 5/1993 | Ney | A23G 9/045 222/229 |
| D336,041 S | 6/1993 | Zama | |
| 5,224,623 A | 7/1993 | Lafleur | |
| 5,253,801 A | 10/1993 | Bernstein et al. | |
| 5,323,956 A | 6/1994 | Marcontell | |
| 5,326,021 A | 7/1994 | Farrell et al. | |
| 5,328,263 A * | 7/1994 | Neilson | A23G 9/045 366/254 |
| 5,351,879 A | 10/1994 | Liu et al. | |
| 5,362,509 A | 11/1994 | Martens | |
| 5,439,289 A * | 8/1995 | Neilson | A23G 9/045 366/206 |
| D369,971 S | 5/1996 | Brauner et al. | |
| D375,683 S | 11/1996 | Schoff | |
| 5,580,007 A * | 12/1996 | Caviezel | B01F 7/161 241/199.12 |
| 5,803,377 A * | 9/1998 | Farrell | A23G 9/12 241/199.12 |
| 5,865,538 A * | 2/1999 | Walker | B01F 7/1695 366/197 |
| 6,068,875 A * | 5/2000 | Miller | A23G 9/045 222/144.5 |
| D426,160 S | 6/2000 | Lindsay et al. | |
| 6,071,006 A * | 6/2000 | Hochstein | A47J 43/042 366/242 |
| D429,150 S | 8/2000 | Lindsay et al. | |
| D438,794 S | 3/2001 | Miles et al. | |
| D440,829 S | 4/2001 | Brown | |
| 6,241,380 B1 * | 6/2001 | Bornemann | B01F 9/106 366/217 |
| 6,241,381 B1 | 6/2001 | Noda et al. | |
| D445,310 S | 7/2001 | Brown | |
| D452,434 S | 12/2001 | Sweeney | |
| 6,331,070 B1 * | 12/2001 | Desai | B01F 7/162 366/197 |
| 6,465,034 B2 | 10/2002 | Farrell | |
| 6,772,675 B2 * | 8/2004 | Ervin | A23G 9/045 241/101.2 |
| 6,802,641 B2 * | 10/2004 | Ladatto | B01F 7/00316 366/200 |
| D498,390 S | 11/2004 | Vovan | |
| D499,645 S | 12/2004 | Edwards | |
| 6,854,875 B2 * | 2/2005 | McGill | A47J 36/022 366/199 |
| D509,109 S | 9/2005 | Vovan | |
| 6,945,157 B2 * | 9/2005 | Brown | A23G 9/04 222/129.1 |
| D510,843 S | 10/2005 | Vovan | |
| D519,831 S | 5/2006 | De Cleir et al. | |
| 7,144,150 B2 * | 12/2006 | Farrell | B01F 7/1605 366/197 |
| 7,147,365 B2 * | 12/2006 | McGill | A47J 36/022 366/199 |
| 7,160,023 B2 * | 1/2007 | Freude | B01F 7/162 366/273 |
| 7,168,845 B2 * | 1/2007 | McGill | A47J 36/022 366/204 |
| D551,909 S | 10/2007 | Eide et al. | |
| 7,309,156 B2 * | 12/2007 | McGill | A47J 36/022 366/199 |
| D570,650 S | 6/2008 | Vovan | |
| D572,133 S | 7/2008 | Wilson et al. | |
| 7,395,726 B2 | 7/2008 | Sekizawa et al. | |
| 7,476,018 B2 * | 1/2009 | McGill | A47J 43/046 366/197 |
| D587,995 S | 3/2009 | Studee | |
| 7,520,662 B2 * | 4/2009 | Farrell | A47J 43/0705 134/115 R |
| D627,636 S | 11/2010 | Fang | |
| D629,683 S | 12/2010 | Fang | |
| 7,938,574 B2 | 5/2011 | McGill | |
| D644,924 S | 9/2011 | Lin | |
| D666,904 S | 9/2012 | Snedden et al. | |
| 8,430,257 B2 | 4/2013 | Fetvedt et al. | |

(56) References Cited

U.S. PATENT DOCUMENTS

| | | | |
|---|---|---|---|
| D690,198 S | 9/2013 | Haracourt et al. | |
| D693,673 S | 11/2013 | De Witte et al. | |
| 8,763,515 B2* | 7/2014 | Farrell | A23G 9/045 |
| | | | 99/275 |
| 8,807,823 B2* | 8/2014 | Williams | B01F 7/161 |
| | | | 366/197 |
| 8,899,147 B2 | 12/2014 | Dille | |
| 8,960,999 B1* | 2/2015 | Ochoa | A47J 43/044 |
| | | | 366/207 |
| D724,426 S | 3/2015 | Hu | |
| D736,614 S | 8/2015 | Rapparini | |
| D736,617 S | 8/2015 | Sy | |
| D745,825 S | 12/2015 | Bushida et al. | |
| D748,436 S | 2/2016 | Kent | |
| D752,971 S | 4/2016 | Vu et al. | |
| D764,908 S | 8/2016 | Shiffer et al. | |
| D766,079 S | 9/2016 | Shiffer et al. | |
| D769,070 S | 10/2016 | Heimsoth et al. | |
| 9,833,109 B2* | 12/2017 | Farrell | A47J 43/044 |
| 2001/0023870 A1 | 9/2001 | Mihalov et al. | |
| 2002/0189460 A1* | 12/2002 | Brown | A23G 9/04 |
| | | | 99/275 |
| 2003/0019871 A1 | 1/2003 | Nance | |
| 2003/0226923 A1 | 12/2003 | Starr et al. | |
| 2004/0016761 A1 | 1/2004 | Wilde et al. | |
| 2004/0120214 A1* | 6/2004 | Ladatto | B01F 7/00316 |
| | | | 366/202 |
| 2005/0201198 A1* | 9/2005 | Farrell | A47J 43/0705 |
| | | | 366/138 |
| 2006/0039235 A1* | 2/2006 | McGill | A47J 43/046 |
| | | | 366/279 |
| 2006/0077756 A1* | 4/2006 | Farrell | B01F 7/1605 |
| | | | 366/347 |
| 2007/0119867 A1* | 5/2007 | Nakato | A23G 9/045 |
| | | | 222/222 |
| 2008/0037360 A1 | 2/2008 | McGill | |
| 2008/0279040 A1* | 11/2008 | Neilson | B01F 7/1605 |
| | | | 366/176.1 |
| 2010/0145522 A1* | 6/2010 | Claesson | B67D 1/0021 |
| | | | 700/265 |
| 2012/0087203 A1* | 4/2012 | Williams | B01F 7/161 |
| | | | 366/138 |
| 2012/0318810 A1 | 12/2012 | Hodge et al. | |
| 2013/0217010 A1 | 8/2013 | Suchocki et al. | |
| 2013/0224341 A1 | 8/2013 | Bendavid | |
| 2013/0272086 A1 | 10/2013 | Spray | |
| 2013/0341446 A1 | 12/2013 | Farrell et al. | |
| 2014/0043931 A1 | 2/2014 | Figueroa | |
| 2014/0166530 A1 | 6/2014 | Cassens et al. | |
| 2014/0211586 A1 | 7/2014 | Conti | |
| 2015/0290607 A1* | 10/2015 | Tolle | B01F 7/00133 |
| | | | 366/199 |
| 2016/0029844 A1* | 2/2016 | Pineda | A47J 43/046 |
| | | | 366/142 |
| 2016/0083174 A1 | 3/2016 | Halliday et al. | |
| 2016/0244237 A1 | 8/2016 | Hentzel et al. | |
| 2016/0270598 A1* | 9/2016 | Vu | A47J 43/0716 |
| 2016/0367073 A1* | 12/2016 | Smith | A47J 36/34 |
| 2017/0172348 A1* | 6/2017 | Vu | A47J 43/0716 |
| 2017/0202397 A1* | 7/2017 | Vu | A47J 43/046 |
| 2017/0202398 A1* | 7/2017 | Vu | A47J 43/046 |
| 2017/0202399 A1* | 7/2017 | Vu | A47J 43/046 |

FOREIGN PATENT DOCUMENTS

| | | |
|---|---|---|
| JP | 2002-165710 | 6/2002 |
| WO | WO-2012/170821 | 12/2012 |

OTHER PUBLICATIONS

International Search Report and Written Opinion dated Dec. 29, 2015 in PCT Application No. PCT/US2015/041984 (10 pages).
U.S. Notice of Allowance dated Nov. 20, 2015 in U.S. Appl. No. 29/521,542.
U.S. Notice of Allowance on U.S. Appl. No. 14/808,442 dated Apr. 14, 2016.
U.S. Office Action dated Dec. 9, 2015 in U.S. Appl. No. 14/808,442.
U.S. Restriction Requirement dated Sep. 21, 2015 in U.S. Appl. No. 14/808,442.
International Search Report and Written Opinion dated Aug. 9, 2016, International Application No. PCT/US2016/030199.
U.S. Office Action dated Jul. 15, 2016 in U.S. Appl. No. 15/143,058.
International Preliminary Report on Patentability for application No. PCT/US2016/030199 dated Nov. 9, 2017.
Notice of Allowance on U.S. Appl. No. 15/143,058 dated Dec. 16, 2016, 11 pgs.
Office Action on U.S. Appl. No. 29/555,101 dated Aug. 25, 2017, 10 pgs.
Office Action on U.S. Appl. No. 29/555,101 dated Mar. 8, 2018, 5 pgs.

* cited by examiner

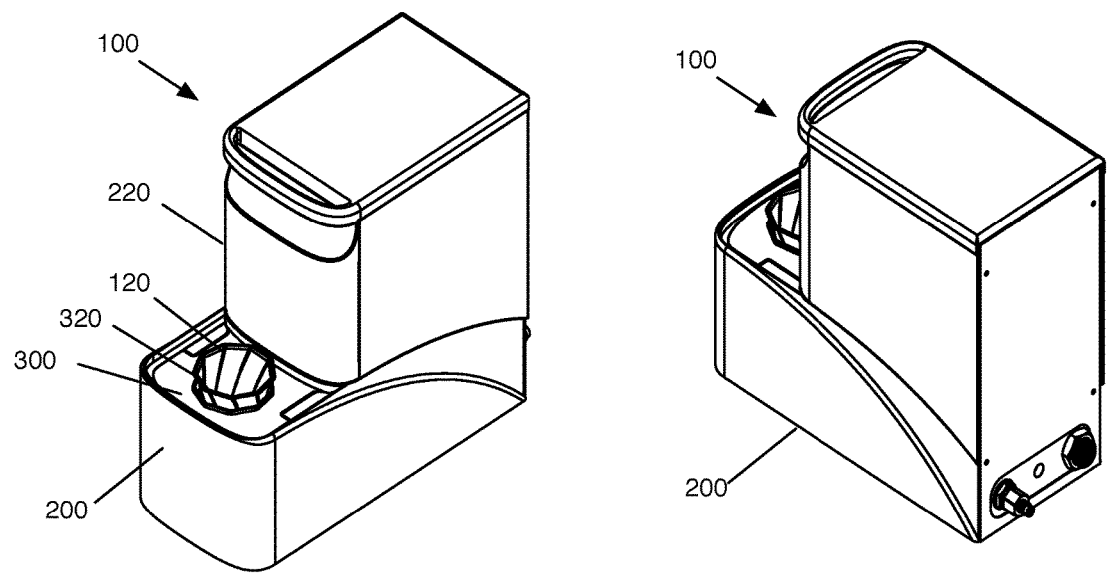
FIGURE 1A
FIGURE 1B
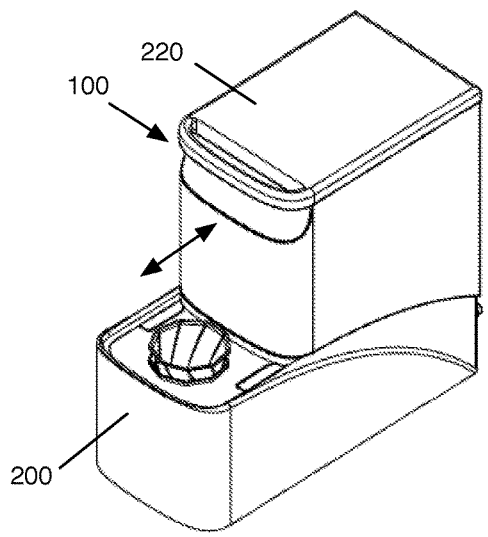
FIGURE 2

AUTOMATED FOOD PROCESSING SYSTEM AND METHOD

CROSS-REFERENCE TO RELATED APPLICATIONS

This application is a Divisional of, and claims priority to, U.S. application Ser. No. 14/808,442filed Jul. 24,2015, which claims the benefit of U.S. Provisional Application Nos. 62/031,076, filed Jul. 30, 2104; 62/076,188,filed Nov. 6, 2014; 62/133,674, filed Mar. 16,2015; and 62/154,466, filed Apr. 29, 2015, the entire contents of which are hereby incorporated by this reference for all purposes.

TECHNICAL FIELD

This invention relates generally to the field of blending foods and more specifically to a new and useful automated food processing system and related method for blending foods.

BRIEF DESCRIPTION OF THE FIGURES

FIGS. 1A and 1B are isometric views of an example of the system.

FIG. 2 is a schematic representation of a door actuation path.

DESCRIPTION OF THE PREFERRED EMBODIMENTS

The following description of the preferred embodiments of the invention is not intended to limit the invention to these preferred embodiments, but rather to enable any person skilled in the art to make and use this invention.

1. Automated Food Processing System

Figure 3:
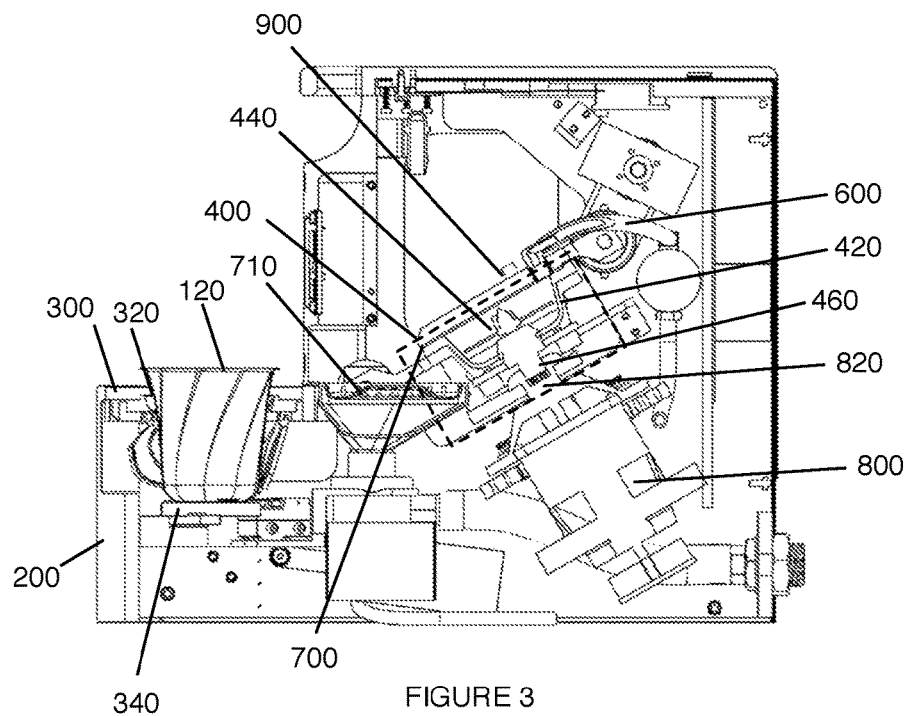
FIG. 3 is a cutaway view of the example of the system.

As shown in FIG. 3, an automated food processing system 100 includes: a housing 200; a container platform 300 operable between a loading position 302 and a processing position 304; a blade assembly 400 including: a blade platform 420 operable between an engaged position 422 and a disengaged position 424 and a set of blades 440 rotatably mounted to the blade platform 420; and a blade actuator 800.

In one variation, the automated food processing system is an automatic blending system, and is configured to blend the food solids into an emulsion.

In one variation of the automated food processing system further includes: a blade shield 900 transiently operable in a clean position, the blade shield 900 substantially enveloping the blender blade in the cleaning position during a clean cycle; a cleaning fluid injector injecting a volume of cleaning fluid into the lumen formed between the blade shield 900 and the blade platform 420 during the clean cycle; and a drain adjacent the blade actuator 800 and receiving the volume of cleaning fluid from the blade shield 900 via the spout. The system 100 can additionally or alternatively include a door 220 operable between an open position and a closed position, the door 220 cooperatively enclosing the container platform 300, blade platform 420, set of blades 440, and blade actuator 800 in the closed position and exposing at least the container platform 300 in the open position; a set of sensors used to determine the presence of the container 120 within the container receptacle 320, the lid position, or any other operation parameter; and a processor 180 that automatically controls system operation.

However, the system 100 can include any other suitable component.

2. Applications

Generally, the automated food processing system 100 functions to process foodstuff. In one variation, the automated food processing system automatically blends food solids, such as frozen or whole food, into an emulsion. The system 100 preferably processes single-serve food portions (e.g., portions of 8-16 oz), but can alternatively process multiple-serve food portions (e.g., portions of 2-4 L). The system 100 is preferably a countertop system, but can alternatively be a large appliance (e.g., for use in an office or café setting), or have any other suitable form factor. The system 100 is preferably self-contained, but can alternatively connect to one or more utilities (e.g., an electricity outlet and/or water supply, such as a faucet). The automated food processing system preferably processes foods into smoothies, but can alternatively or additionally make soups, baby food, sauces, chopped food, food mixes (e.g., batter), or otherwise process the food.

In operation, the automated food processing system functions to receive a container 120 (e.g., a cup, a bowl) containing food solids, to automatically process (e.g., mix, blend) the food solids within a processing cavity entirely or partially formed by the container 120 into a mixture (e.g., an emulsion), to deliver the mixture back to a consumer for consumption directly from the container 120, and to automatically clean the portions of the automated food processing system in direct contact with the food solids and/or the emulsion.

In a first specific example, the automated food processing system can define a self-contained, countertop system that receives the cup containing frozen fruit and/or frozen vegetables. The system 100 can automatically dispense a particular volume of water into the cup once the cup has been loaded into the automated food processing system. The system 100 can automatically invert the cup and blend its contents into a smoothie, and return the cup—now containing the smoothie—to a consumer. The system 100 can automatically clean all or portions of the automated food processing system in contact with the fruit, vegetables, and/or smoothie in preparation for receiving a subsequent cup of frozen fruit and/or vegetables.

In a second specific example, the system 100 can additionally or alternatively receive a bowl containing soup ingredients, such as sliced vegetables, cream, stock, and spices, and the automated food processing system can then automatically blend the contents of the bowl into a soup, deliver the bowl back to a consumer for consumption of the soup directly from the bowl, and clean elements of the automated food processing system in contact with the soup or the soup ingredients in preparation for blending food solids in a subsequent cup or bowl loaded into the automated food processing system.

However, the automated food processing system can function as a standalone system for processing any other type of food solids into a mixture or an emulsification in situ within a container 120, wherein the container defines both a storage container 120 for the food solids and a consumption container 120 from which a consumer consumes the emulsification. For example, the automated food processing system can blend fruit into a smoothie, blend vegetables into a soup, process vegetables into salad, blend cornmeal into grits, grind oats into oatmeal, and/or blend fruits and vegetables into baby food, etc.

3. Container and Foodstuff

The automated food processing system can accept a container 120 containing one or more foodstuffs to be blended. The container 120 can include a body, which defines a container opening fluidly connected to a container 120 lumen that retains the foodstuff. The container 120 can additionally include a container lid. The container 120 is preferably configured to removably couple (e.g., transiently couple) to the container receptacle 320, but can alternatively substantially permanently couple or otherwise couple to the container receptacle 320 or container platform 300.

The container 120 can be prepackaged (e.g., be provided by a manufacturer or supplier with the foodstuff pre-arranged within the container 120), be filled by a user, or be otherwise supplied. The container 120 can be disposable (e.g., made of wax paper, cardboard, bamboo, plant fiber, polypropylene, etc.) or reuseable (e.g., made of thermoplastic, silicone, etc.). The container 120 can be rigid, flexible, or have any other suitable deformation property (e.g., elasticity or rigidity). The container 120 can be thermally insulative, thermally conductive, or have any other suitable thermal property. The container 120 can be transparent, translucent, opaque, or have any other suitable optical property. The container 120 can be cylindrical, prismatic, frustroconical, or have any other suitable shape.

The container 120 (vessel) can include keying features (location features) that function to orient the container 120 within the container receptacle 320 and/or resist container rotation during the blend cycle. The container keying features are preferably complimentary to keying features on the container receptacle 320, but can alternatively be mismatched or have any other suitable relationship to the container receptacle keying features. The keying feature can be the container profile, a feature (e.g., protrusion, depression, aperture, etc.) along the container housing 200, or include any other suitable keying feature. The keying feature is preferably defined along the portion of the container 120 configured to engage the container receptacle 320, but can alternatively be defined along the entirety of the container face (e.g., along the entire container 120 length, entire container base, etc.) or be defined along any other suitable portion of the container 120. The keying feature can be defined along the container housing 200 (e.g., along the base or sidewall), along the container lid, or along any other suitable portion of the container 120. In one variation, the keying feature can include a multi-sided container cross-section, such as a polygon (e.g., an octagon, nonagon, etc.).

In a specific variation, the keying feature can be the container edge or lip defining the container opening, wherein the container lip cross-section can be multi-sided. In a second variation, the keying feature can be an asymmetric protrusion extending radially from the container sidewall. However, any other suitable keying feature can be used.

The container 120 can additionally include flow features that facilitate turbulent flow generation, such as spiral features on the wall (e.g., in the direction of rotation, against the direction of rotation, etc.), protrusions extending radially inward from the wall, or include any other suitable feature that encourages turbulent flow. The flow features are preferably defined along the wall interior (e.g., the wall face defining the container 120 lumen), but can be defined elsewhere.

The container 120 can additionally include a container lid, which functions to seal the foodstuff within the container 120 lumen. The container lid can be a snap lid, a sheet melted, adhered, or otherwise coupled to the container opening, or be any other suitable container lid. The container 120 can be inserted into the system 100 with the container lid, wherein the system 100 automatically manages the container lid (e.g., removes the container lid, pierce the container lid, etc.), or be inserted into the system 100 without the container lid. In the latter instance, the user preferably removes the container lid prior to container 120 insertion into the system 100. In this instance, the system 100 can additionally notify the user in response to determination that the container lid is still on the container 120. However, the container lid can be otherwise processed.

For example, a container 120 can be cup containing frozen strawberries, frozen blueberries, and frozen yogurt and sealed with a lid, such as a molded polymer snap lid or a wax-paper lid bonded over an opening of the cup. The cup lid can be removed from the cup and the cup then loaded into the automated food processing system by a user, the automated food processing system can execute the method to add fluid (e.g., water, juice, milk, etc.) to the cup and to blend the frozen strawberries, frozen blueberries, and frozen yogurt in a fruit smoothie, and the cup then removed from the automated food processing system and the smoothie consumer directly from the cup by the user.

The foodstuff can be substantially whole foodstuff (e.g., whole berries, whole nuts, whole seeds, whole fruits), be pre-blended foodstuff refrozen into pellets, discs, or as a solid piece within the cup, be presented in liquid form, or be in any other suitable form factor. In one variation, liquid, high-cellulose content, and/or foods with a high clumping probability (e.g., apples) are preblended and re-formed into pellets that are subsequently included in the cup, while other foods, such as berries, can be included as whole fruits in the cup. The foodstuff temperature is preferably maintained at substantially 0° F. (e.g., within a margin of error, such as several degrees) but can alternatively be maintained at 15-20° F., maintained at room temperature, or be maintained at any other suitable temperature.

However, the automated food processing system can receive a container 120 of any other form and containing any other food solids, and the automated food processing system can execute the method in any other way to automatically process the food solids for a user.

4. Housing

As shown in FIGS. 1, 2, and 3, the housing 200 of the automated food processing system functions as a mounting point and support for the system components. The housing 200 (system body) also functions to house and enclose the system components. The housing 200 can include a base and sidewalls extending from the base. The sidewalls can extend from the base at a normal angle (e.g., at a 90° angle), or extend from the base at any other suitable angle. The sidewalls and/or base are preferably rigid, but can alternatively be flexible or have any other suitable material property. The housing 200 is preferably substantially opaque, but can alternatively be transparent or translucent.

The automated food processing system 100 can additionally include a door 220 that functions to cooperatively enclose the system components with the housing 200. The door 220 is preferably operable between an open position and a closed position. The door 220 preferably cooperatively encapsulates the container receptacle 320 within the housing 200 in the closed position and exposes the container receptacle 320 in the open position, but can additionally or alternatively enclose the container platform 300, blade assembly 400 (e.g., including the blade platform 420 and set of blades 440), blade actuator 800, or any other suitable component within the housing 200 in the closed position and expose the component in the open position.

The door 220 is preferably actuatably mounted to the housing 200, but can alternatively be statically mounted to the housing 200. The door 220 can be slidably engaged to the housing 200, and includes a handle or pull that enables a user to actuate the door 220. In this variation, the housing 200 can form a lower portion of the system body, while the door 220 forms an upper portion of the system body. The upper and lower portions of the system body are preferably coupled along a coupling axis (e.g., substantially aligned with a gravity vector when the base is rested on a support surface), wherein the upper portion (the door 220) slides along a plane perpendicular the coupling axis. The upper portion can slide along a plane substantially parallel the housing base, substantially parallel the container platform 300 in the loading position 302, or slide along any other suitable plane. The interface between the upper and lower portions can include tracks, grooves, magnets, or any other suitable sliding interface. The front face of the upper portion is preferably retracted from the front face of the lower portion in the open position, and preferably aligned with the front face of the lower portion in the closed position. However, the door 220 can be part of a tray that slides in and out of the housing 200, be a door 220 that slides perpendicular to the longitudinal axis of the housing 200, or be slidably coupled to the housing 200 in any other suitable manner. The door can be manually actuated, automatically actuated (e.g., automatically open), and/or be actuated in any other suitable manner. The door actuation mechanism can be active (e.g., driven by a motor), passive, or be actuated in any other suitable manner. In one variation, the door can additionally include a return mechanism (e.g., a spring, magnet, etc.) that biases the door in the open position. However, the door can include any other suitable component.

Alternatively, the door 220 can be pivotally connected to the housing 200. In one variation, a longitudinal edge of the door 220 can be pivotally (rotatably) connected to the housing 200, wherein the door 220 can be arranged along a sidewall of the housing 200. In a second variation, an edge of the door 220 can be pivotally connected to a top of the housing 200. However, the door 220 can be otherwise connected to the housing 200. The housing 200 can additionally or alternatively include any other suitable component.

The housing 200 can additionally include a set of sensors or switches configured to determine the instantaneous door position. Sensors that can be used include tilt sensors, optical sensors, accelerometers, magnetometers, Hall effect sensors, or any other suitable sensor. Switches include contact switches, limit switches, magnetic switches, or include any other suitable type of switch. The sensors or switches are preferably mounted to the door 220 and/or housing 200 (e.g., to the pivot point, to the casing, to the threshold, etc.), but can alternatively be mounted at any other suitable position. The sensors or switches are preferably connected to the processor 180, but can alternatively be connected (e.g., wirelessly or through a wired connection) to any other suitable control system. The door can additionally include soundproofing (e.g., foam), thermal insulation, electrical insulation, or include any other suitable component.

5. Container Platform

The container platform 300 (vessel platform) of the automated food processing system functions to receive and retain the container 120. More preferably, the container platform 300 functions to locate the container 120 laterally, longitudinally, and vertically (in a substantially upright position) within the automated food processing system until the blade platform 420 is closed over the container platform 300 upon initiation of a blend cycle, but can alternatively orient the container 120 in any other suitable orientation. The container platform 300 preferably defines a container receptacle 320 that receives and retains the container 120, but can alternatively receive and retain the container 120 in any other suitable manner. The container platform 300 can additionally cooperatively seal the container 120 against the blade assembly 400, place the container 120 in the processing position 304 (e.g., blending position), facilitate container content heating, retain the container orientation and/or position, or otherwise manipulate the container 120 or contents therein. The container platform 300 is preferably arranged proximal the housing 200 opening (e.g., proximal the door 220), but can alternatively be arranged within the door 220 or be arranged in any other suitable location. The container platform 300 is preferably arranged parallel a housing base and/or perpendicular a gravity vector in the loading position 302, but can alternatively be arranged in any other suitable configuration.

In one example, the container platform 300 can be arranged proximal a front of the automated food processing system in the loading position 302, such as behind or underneath a door 220 of the automated food processing system. A user can retrieve a prepackaged container 120 containing food solids sealed therein by a lid, remove the lid from the container 120, and load the container 120 into the receiver (e.g., through bore) in the container platform 300 currently in the loading position 302. The container can be received through an opening proximal the front of the automated food processing system (e.g., the door opening), at an exposed container receptacle, or otherwise received. Furthermore, when the container platform 300 is set in the loading position 302 in preparation for receiving a new container 120 containing solid foods for blending in a subsequent blend cycle, the blade platform 420 can be in the second position over the blade actuator 800 and the blade shield 900 can be set in the cleaning position over the blender blade to physically shield a user—reaching into the automated food processing system to load a container 120 into the container platform 300—from the blender blade.

The container platform 300 can be substantially planar (e.g., within a margin of error), curved (e.g., convex or concave toward the blade platform 420), or have any suitable configuration. The container platform 300 is preferably larger than the container opening, but can alternatively be smaller than the container opening or have any suitable set of dimensions. The container platform 300 preferably defines a receiving face (e.g., a broad face) and a set of edges bounding the receiving face. The container platform 300 can be thermally conductive (e.g., made of metal), thermally insulative (e.g., made of plastic), or have any other suitable material property.

The container platform 300 can additionally define a container receptacle 320. The container receptacle 320 can be a through-bore configured to receive all or a portion of the container 120 therethrough, a recess configured to receive a portion of the container 120 (e.g., the container base or portion of the container sidewall), or have any other suitable geometry for receiving and supporting a container 120 installed therein. The container receptacle 320 preferably additionally includes a set of keying features complimentary to that of the container 120, but can alternatively include any other set of features. In one example, the container receptacle 320 can be a through-bore, and can additionally include a chamfer or fillet about the bore edge that couples to the polygonal container opening exterior cross-section, wherein the chamfer or fillet further locates the container 120 within the container receptacle 320.

The container receptacle 320 can additionally or alternatively include a retention feature that functions to retain the container position and/or orientation. In one variation, the retention feature can be an aperture smaller than the container lip or opening cross section, such that gravity retains the container 120 within the container receptacle 320 in the loading position 302. In this variation, the blade platform 420 can retain the container 120 within the container receptacle 320 in the processing position 304. In a second variation, the retention feature can be a mechanical feature, such as a slot or clip. In a third variation, the retention feature includes a set of spring-loaded plates biased toward the receiving face that function to seal the container receptacle in a first position and retain an inserted container in a second position. However, the retention feature can be a magnetic element attracted to a ferrous component in the container 120, an adhesive, a set of hooks or loops, or be any other suitable retention feature.

The container platform 300 can be operable between a loading position 302 and a processing position 304, wherein the processing position 304 is distinct from the loading position 302. The loading and processing positions are preferably different angular positions, but can alternatively be different horizontal positions, different vertical positions, or actuate along any other suitable axis. Alternatively, the container platform 300 can be statically coupled to the housing 200. The container platform 300 preferably receives the container 120 in the loading position 302, and retains the container 120 proximal the set of blades 440 or blade actuator 800 in the processing position 304, but can perform any other suitable functionality in the loading and/or processing positions. The container platform 300 can pivot between the loading and processing position 304, but can alternatively slide between the loading and processing position 304 (e.g., laterally, vertically, etc.), or otherwise actuate between the loading and processing positions. The container platform 300 can pivot about the length of a container platform side (e.g., be hinged along the respective corner or edge), pivot about an axis normal to the container platform side face (e.g., about a container platform edge or along a portion of the container platform side), or pivot in any other suitable direction. The container platform 300 is preferably coupled to the housing 200, but can alternatively be coupled to any other suitable portion of the system 100.

Figure 11:
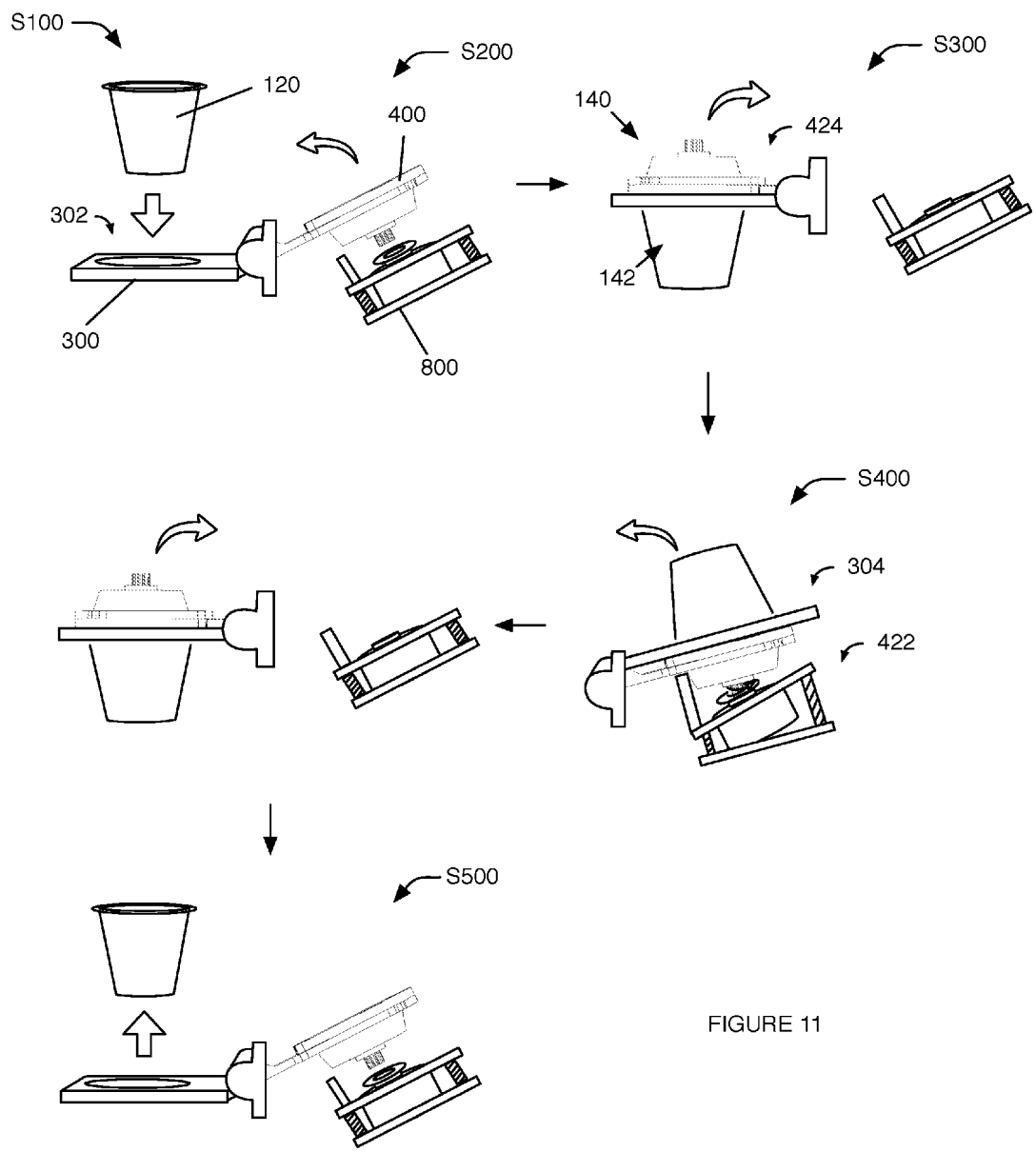
FIG. 11 is a schematic representation of the method of system operation.

As shown in FIGS. 4-7, in the loading position 302, the container platform 300 can be substantially parallel the housing base, perpendicular the housing base, be at an angle between parallel and perpendicular to the housing base, or be in any other suitable orientation. A second container platform edge opposing the pivoting edge is preferably distal the blade actuator 800 in the loading position 302 (e.g., such that a normal vector of the receiving face is at a non-zero angle to the rotational axis of the blade actuator 800, but can alternatively be at any other suitable angle), but can alternatively be proximal the blade actuator 800 or be arranged in any other suitable position. As shown in FIG. 11, in the processing position 304, the container platform 300 can be at an obtuse angle relative to the housing base, substantially parallel the housing base, perpendicular the housing base, be at an angle between parallel and perpendicular to the housing base, or be in any other suitable orientation. The second container platform edge opposing the pivoting edge is preferably proximal the blade actuator 800 in the processing position 304 (e.g., such that a normal vector of the receiving face is substantially parallel to the rotational axis of the blade actuator 800, but can alternatively be at any other suitable angle), but can alternatively be distal the blade actuator 800 or be arranged in any other suitable position. However, the container platform 300 can be otherwise retained relative to the housing 200, and be operable between any other suitable set of positions.

In one example, the container platform 300 is hinged along a trailing edge to the housing 200. The container platform 300 is pivotable about the trailing edge between a loading position 302 and a processing position 304, wherein the receiving face directed upward in the loading position 302 (e.g., with a normal vector opposing a gravity vector) and directed toward the blade actuator 800 in the processing position 304 (e.g., with the normal vector directed toward the blade actuator 800). The container 120 can be a frusto-conical container that tapers towards the container base and defines a rim about the circumference of its open end, the receiving face can define a bore of an internal diameter greater than an outer diameter of the container open end and less than the maximum outer diameter of the rim of the container 120, such that the receiving face supports the container 120 from its rim. The container platform 300 can also define a protrusion extending from the receiving face and extending around the through-bore to elevate the rim of a container 120, loaded into the container receptacle 320, above the receiving face such that the rim of the container 120 contacts and seals against a seal arranged in a base of a recess of the blade platform 420 when the blade platform 420 is locked to the container platform 300, as described below. However, the receiving face of the container platform 300 can define any other suitable geometry for receiving a container 120 of any other suitable geometry.

The system can additionally include a lifting mechanism 340 that functions to bias a retained container 120 out of the system 100. The lifting mechanism 340 preferably biases the container 120 along a vector normal to the container receptacle 320, but can alternatively bias the container 120 along any other suitable vector. The lifting mechanism 340 (e.g., elevator) can be active (e.g., driven by a motor) or passive. Examples of the passive lifting mechanism 340 include a spring, magnet, or pendulum biasing a lifting platform upward (e.g., toward the container receptacle 320), wherein the passive lifting mechanism 340 can be retained in a receiving position (e.g., such that the mechanism does not bias the container 120 upward) by a switch, latch, or other mechanism. The lifting mechanism 340 is preferably operated in response to completion of the processing cycle, but can alternatively be operated at any other suitable time.

The container platform 300 can additionally include a set of container platform sensors or switches that function to detect the presence of a container 120 within the container receptacle 320. The sensor and/or switch output can additionally function to identify the type of container 120 within the container receptacle 320. The sensor can be arranged on the container platform, the lifting mechanism, or any other suitable portion of the system body. Sensors that can be used include tilt sensors, optical sensors (e.g., a laser tripwire), accelerometers, magnetometer, Hall effect sensors, pressure sensors, force sensors (e.g., piezoelectric, strain gauge, etc.), or any other suitable sensor. Switches include contact switches, limit switches, magnetic switches, or include any other suitable type of switch. The sensors or switches are preferably mounted to the container receptacle 320 (e.g., within the container receptacle 320, at the container receptacle 320 opening, etc.), more preferably the lifting mechanism 340 but alternatively the container receptacle 320 opening or any other suitable portion of the container receptacle 320. However, the sensors or switches can be mounted to any other suitable portion of the container platform 300. The sensors or switches are preferably connected to the processor 180, but can alternatively be connected (e.g., wirelessly or through a wired connection) to any other suitable control system.

6. Blade Assembly

Figure 9:
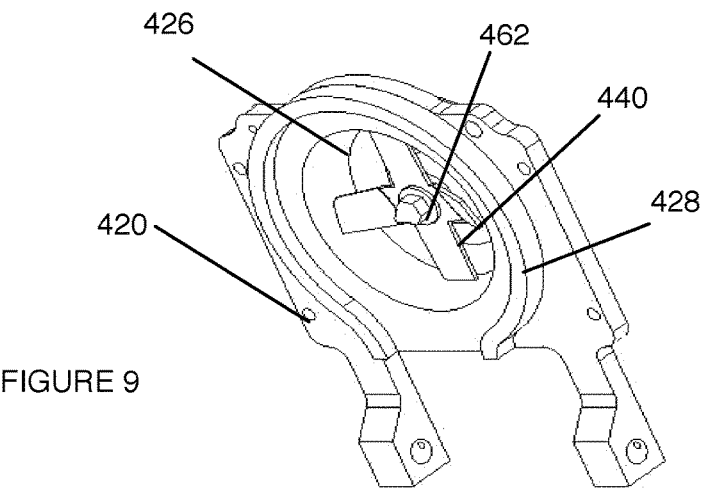
FIG. 9 is an isometric view of a variation of the blade assembly with a blade recess.

The blade assembly 400 of the automated food processing system functions to retain the blades, and can additionally function to engage with the container 120 and/or container platform 300, facilitate desired flow within the processing lumen cooperatively formed between the blade assembly 400 and the container 120 (e.g., turbulent flow), or perform any other suitable functionality. As shown in FIG. 9, the blade assembly 400 includes a blade platform 420 and a set of blades 440, and can additionally include a drive shaft connected to the blades, sensors, a locking mechanism 480, or any other suitable component. The blade assembly and blade actuator preferably cooperatively forms a split drive system in which the blade assembly is selectively couplable to the blade actuator, but can alternatively be substantially permanently coupled (e.g., wherein the blade actuator moves with the blade assembly) or have any other suitable configuration.

Figure 12:
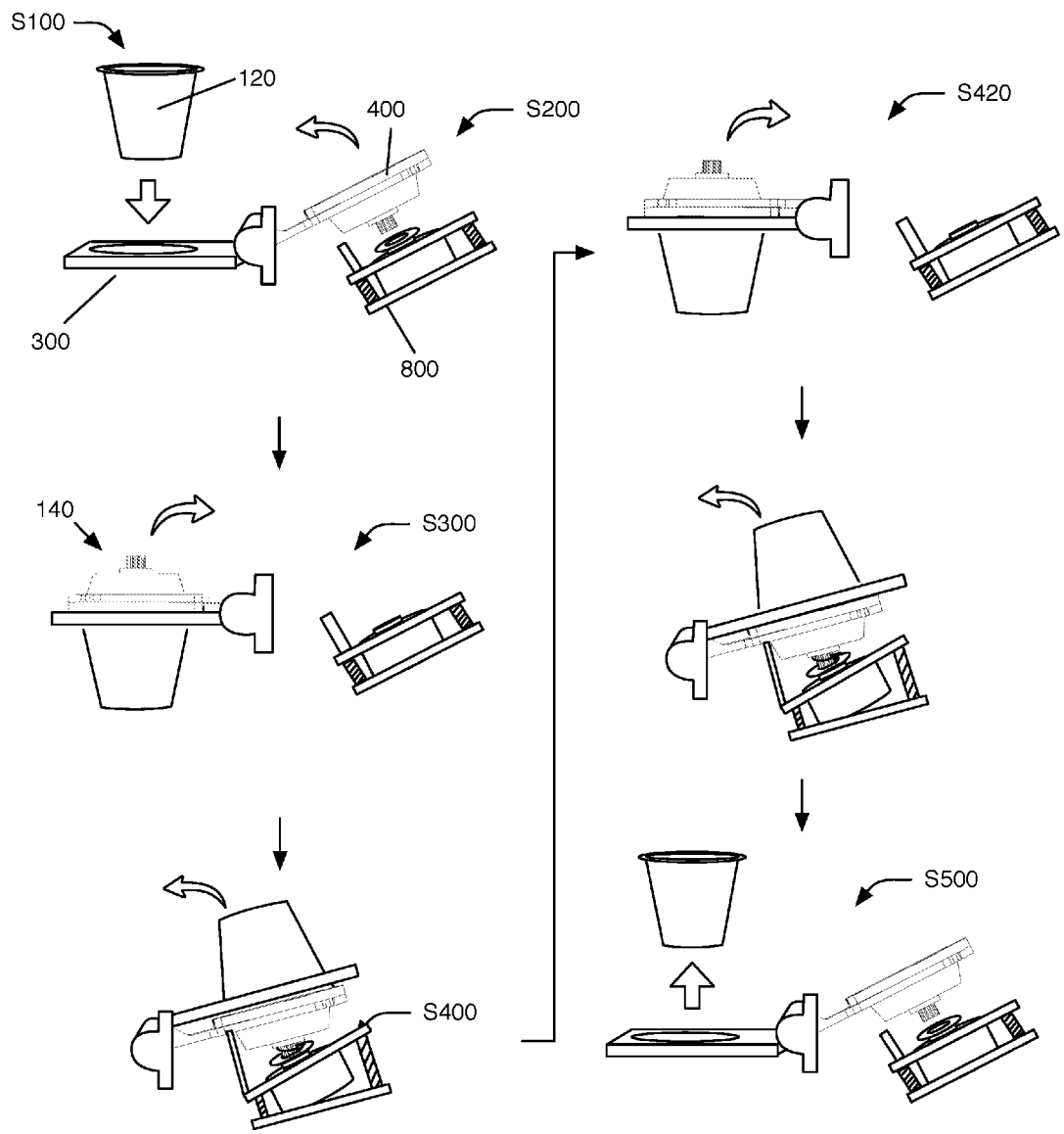
FIG. 12 is a schematic representation of the method of system operation, including processing unit agitation.
Figure 13:
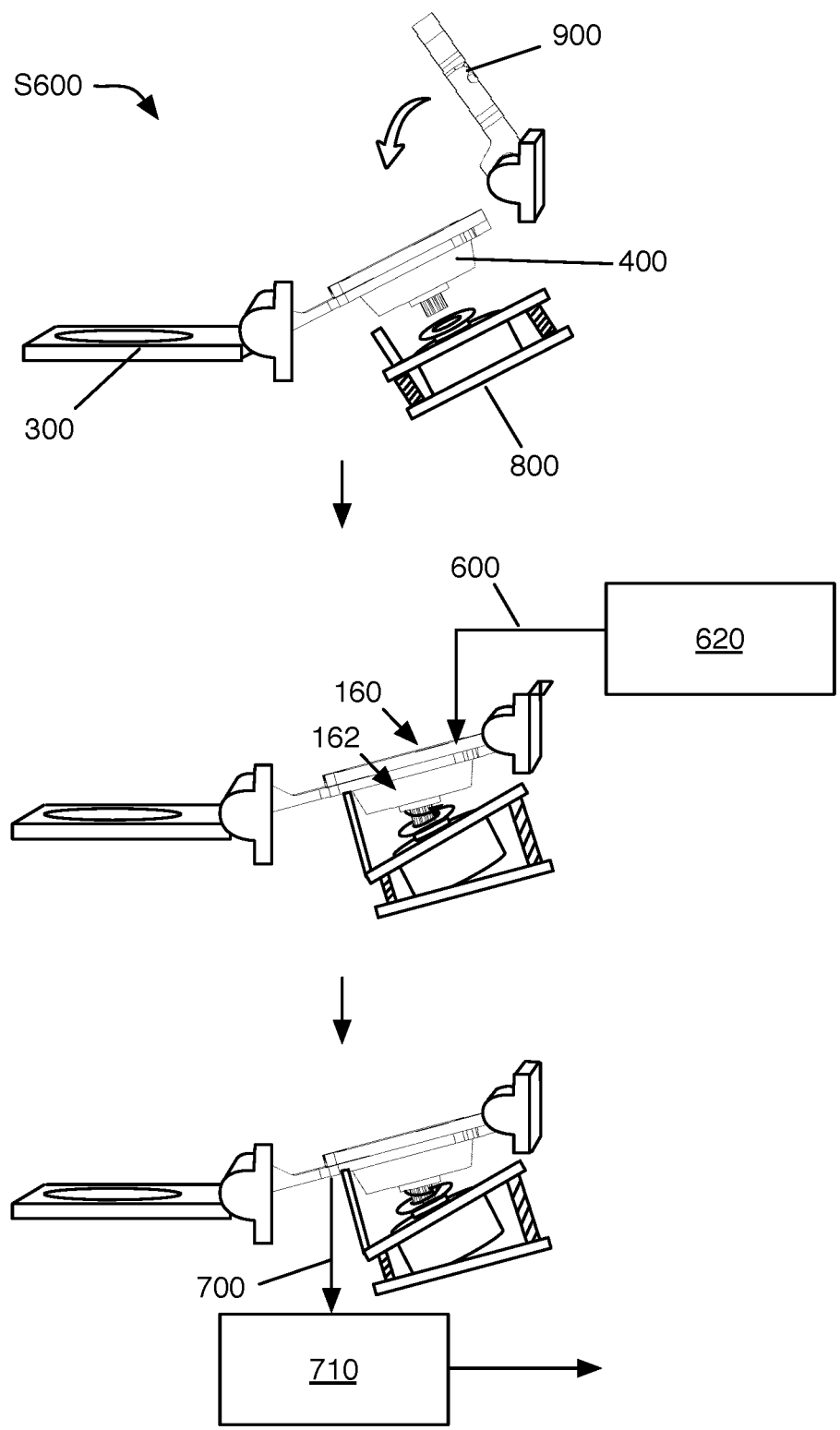
FIG. 13 is a schematic representation of the cleaning the blade assembly.

The blade assembly 400 preferably actuates relative to the blade actuator 800, the container platform 300, and/or the housing 200, as shown in FIGS. 11, 12, and 13, but can alternatively remain substantially static. The blade assembly 400 is preferably pivotable between an engaged position 422 and a disengaged position 424, but can alternatively slide between the first and the blade platform 420 or actuate in any other suitable manner. The engaged position 422 is preferably complimentary (e.g., substantially similar to) the processing position 304 of the container platform 300, while the disengaged position 424 is preferably complimentary to the loading position 302 of the container platform 300. However, the blade assembly 400 can be operable between any other suitable set of positions. The blade assembly 400 preferably actuates about a portion of the blade platform 420, but can alternatively actuate about any other suitable component. The blade assembly 400 is preferably arranged over and adjacent the container platform 300 in the disengaged position 424 and operatively mates the blades to the blade actuator 800 in the engaged position 422, but can alternatively operate in any other suitable manner.

In operation, one variation of the blade assembly 400: latches to the container platform 300 in the disengaged position 424; moves to the engaged position 422 (with the container platform 300, such that the container platform 300 is in the processing position 304) to facilitate container content blending; returns to the disengaged position 424 with the container platform 300 (and the container 120, now with blended contents) to the loading position 302, such that the container 120 is in the loading position 302; then moves back to the engaged position 422 without the container platform 300 to reveal the container 120 for removal from the automated food processing system by a user. However, the blade assembly 400 can operate in any other suitable manner.

In a specific example, the blade assembly 400 includes a set of bearings (e.g., two tapered bearings) that are set in the bore of the blade platform 420, a driveshaft 460 extending through the blade platform 420 and supported between the set of bearings, a coupler fixed to back end of the driveshaft 460 and configured to engage an output shaft of the blade actuator 800 (e.g., blade actuator interface 820), a rotor defining a set of sharpened blades (e.g., sharpened stainless steel blades) extending from the driveshaft 460 over a container 120-facing surface of the blade platform 420, and a seal 428 sealing the driveshaft 460 to the container 120-facing surface of the blade platform 420. The rotor with sharpened blades can be undersized for the open end of the container 120 such that the blades clear the internal walls of container 120 as the blade platform 420 is rotated into the first position adjacent the container platform 300, the blades thus passing fully into the container 120 along an arcuate path. However, the blades can be of any other form or type and can be mounted in any other way to the blade platform 420.

6.1. Blade Platform

The blade platform 420 functions to support the set of blades 440, and can additionally function to support and/or retain the driveshaft 460. The blade platform 420 can additionally function to cooperatively form a processing chamber 142 with the container 120 and/or container platform 300, and can facilitate formation of desired flow patterns within the processing chamber 142. In one variation, the blade platform 420 (e.g., a planar or curved surface) and the container platform 300 cooperatively retains a container lip therebetween, wherein the processing chamber 142 is formed between the blade platform 420 and the container 120 lumen. However, processing chamber 142 can be formed by the blade platform 420 sealing against the container platform 300 or be otherwise formed.

The blade platform 420 preferably defines a processing face (e.g., a broad face) bounded by a set of edges and sides. The processing face is preferably arranged proximal the container platform 300, but can alternatively be arranged distal the container platform 300 or arranged in any other suitable orientation. The blade platform 420 can additionally define a blade recess 426 (e.g., recessed blade chamber) that functions to entirely or partially surround the set of blades 440, a driveshaft 460 aperture, or any other suitable feature. Alternatively, the blade platform 420 can be substantially flat, continuous, or have any other suitable configuration. The blade platform 420 can additionally include a seal 428 that functions to seal against the container 120, container platform 300, or container receptacle 320, or include any other suitable component.

The blade platform 420 of the blade assembly 400 is preferably acutatable relative to the housing 200, wherein blade platform 420 actuation actuates the blade assembly 400, but can alternatively be statically coupled to the housing 200 or otherwise coupled to the housing 200. In one variation, the blade platform 420 is pivotable between the engaged position 422 and the disengaged position 424, wherein the engaged position 422 is distinct from the disengaged position 424. The engaged and disengaged positions are preferably different angular positions, but can alternatively be different horizontal positions, different vertical positions, or actuate along any other suitable axis. In this variation, the blade platform 420 can be arranged over and adjacent the container platform 300 (in the loading position 302) in the disengaged position 424, and can be engaged with or be proximal to the blade actuator 800 in the engaged position 422. The blade platform 420 can pivot about the length of a blade platform side (e.g., be hinged along the respective corner or edge), pivot about an axis normal to the blade platform side face (e.g., about a blade platform edge or along a portion of the blade platform side), or pivot in any other suitable direction. However, the blade platform 420 can slide or otherwise actuate between the engaged and disengaged positions. The blade platform pivot axis can be parallel to the container platform pivot axis, be shared with (i.e., coincident) the container platform pivot axis, be at a non-zero angle to the container platform pivot axis, or be otherwise related to the container platform pivot axis, The blade platform 420 is preferably coupled to the housing 200, but can alternatively be coupled to any other suitable portion of the system 100.

In the disengaged position 424, the blade platform 420 can be substantially parallel the housing base, perpendicular the housing base, be at an angle between parallel and perpendicular to the housing base, be aligned with the container platform 300 in the loading position 302, contact the container platform 300 in the loading position 302, or be in any other suitable orientation. A second blade platform edge opposing the pivoting edge or face is preferably distal the blade actuator 800 in the disengaged position 424 (e.g., such that a normal vector of the processing face is at a non-zero angle to the rotational axis of the blade actuator 800, but can alternatively be at any other suitable angle), but can alternatively be proximal the blade actuator 800 or be arranged in any other suitable position. In the engaged position 422, the blade platform 420 can be at an obtuse angle relative to the housing base, substantially parallel the housing base, perpendicular the housing base, be at an angle between parallel and perpendicular to the housing base, contact or be aligned with the container platform 300 in the processing position 304, be arranged proximal the blade actuator 800, or be in any other suitable orientation. The second blade platform edge opposing the pivoting edge or face is preferably proximal the blade actuator 800 in the engaged position 422 (e.g., such that a normal vector of the processing face is substantially parallel to the rotational axis of the blade actuator 800, but can alternatively be at any other suitable angle), but can alternatively be distal the blade actuator 800 or be arranged in any other suitable position. However, the blade platform 420 can be otherwise retained relative to the housing 200, and be operable between any other suitable set of positions.

The blade platform 420 can be rigid or flexible. The blade platform 420 can be thermally conductive, thermally insulative, or have any other suitable material property. The blade platform 420 can be made of metal, polymer, rubber, or any other suitable material. The blade platform 420 can be substantially planar, substantially continuous, or define one or more features.

6.1.1. Blade Recess

In one variation as shown in FIGS. 3, 6, 7, and 9, the blade platform 420 defines a blade recess 426 that functions to surround all or a portion of the blades. The set of blades 440 preferably do not extend beyond the opening plane defined by the blade recess 426, but can alternatively extend beyond the recess. This configuration can confer several benefits, including: increasing the volume of foodstuff that can be processed (e.g., by reducing the amount of volume occupied by the blade within the cup while blending); reducing blending stress, thereby enabling higher-speed and/or powered processing, such as blending (e.g., such that whole vegetables and fruits can be blended); and a more uniform blended matter consistency.

The blade recess 426 preferably defines an opening configured to couple to the container 120 and/or container receptacle 320 opening. The blade recess 426 opening can be slightly larger than the container 120 and/or container receptacle 320 opening, slightly smaller than the container 120 and/or container receptacle 320 opening, substantially the same dimensions and/or geometry as the container 120 and/or container receptacle 320 opening, or be otherwise configured. The blade recess 426 is preferably defined in the processing face and is concave, but can alternatively be defined along any other suitable surface and be convex, prismatic, conical, frustroconical, or have any other suitable shape. In one example, the blade recess 426 can include a spherical dome (spherical cap). In a second example, the blade recess 426 can be substantially cylindrical, with rounded edges (e.g., a tapered cylinder with edge blends, a straight cylinder, etc.). In a third example, the blade recess 426 can be conical, with the cone apex proximal the blade platform 420 face opposing the processing face. However, the blade recess 426 can be otherwise configured.

The blade platform 420 can conform to the blade recess 426 (e.g., such that the blade platform 420 face opposing the processing face has a profile mirroring the blade recess 426 geometry), or the blade recess 426 can be defined within the thickness of the blade platform 420. However, the blade recess 426 can be otherwise related to the blade platform 420. The blade recess 426 can have a substantially smooth surface, have a textured surface, include grooves or swirls (e.g., in the direction of blending blade rotation, in an opposing direction, etc.), or include any other suitable feature. The features can promote desired flow formation (e.g., direct fluid flow within the processing chamber 142); reduce blending stress on the blade platform 420, blades 440, driveshaft 460, container 120, or container platform 300; facilitate container 120 sealing to the blade platform 420, or perform any other suitable functionality.

6.1.2. Driveshaft Bore

The blade platform 420 can additionally define a driveshaft bore that accepts a driveshaft 460 of the blender assembly therethrough. The driveshaft bore is preferably coaxially arranged with the region of the blade platform 420 configured to engage with the container 120 and/or container receptacle 320 (engagement region), but can alternatively be arranged offset within the engagement region or arranged in any other suitable location. In the variant in which the blade platform 420 defines the blade recess 426, the driveshaft bore is preferably defined at the apex or along the central axis of the blade recess 426, but can alternatively be defined offset from the apex or central axis of the blade recess 426, or be defined in any other suitable position.

The driveshaft bore preferably has a smooth arcuate surface, but can alternatively be splined or include any other suitable feature. In one implementation, the driveshaft bore can include a set of bearings (e.g., two tapered bearings), wherein the driveshaft 460 extends through the blade platform 420 and supported between the set of bearings.

6.1.3. Seal

As shown in FIG. 9, the blade platform 420 can also include a seal 428 that—when the blade platform 420 is moved into the first position and is locked to the container platform 300—engages the container 120 (e.g., the container 120 rim, container opening, container edges, etc.) and/or container receptacle 320 to prevent foodstuff egress from the container 120 while the foodstuff is being processed (e.g., blended). In one example, the seal can prevent foodstuff within the container 120 from leaking out from between the container 120 rim and the blade platform 420 when the container 120 is (substantially) inverted and its contents are being blended during a blend cycle. The seal can additionally engage with the blade shield 900 to cooperatively form a wash chamber therebetween, or engage with any other suitable component.

The seal 428 can extend along the engagement region or merely trace the perimeter of the engagement region. In one variation, the seal can define a circular recess slightly oversized in interior diameter for the circular rim of the container 120, wherein the circular recess receives the rim of the container 120 such that a base of the recess seals against the rim of the container 120 when the blade platform 420 is locked to the container platform 300. Alternatively, when the blade platform 420 defines a blade recess 426, the seal can be arranged within the blade recess 426 or along the edge of the blade recess 426 to seal against the rim of a container 120. However, the seal can have any other suitable geometry or set of features. The seal can be made of elastomeric material (e.g., a polymer), gel, metal, rigid plastic, or be made of any other suitable material. For example, the seal can including a food-safe o-ring sized to match the diameter of the rim of standard-sized container 120. The seal can additionally function to define all or a portion of the egress manifold, the fluid dispenser, or any other suitable element.

6.2. Blade Set

The set of blades 440 of the blade assembly 400 function to process the foodstuff within the processing chamber 142, and/or generate turbulent flow within the processing chamber 142 and/or cleaning chamber 162 (e.g., cooperatively formed by the blade platform 420 and the blade shield 900). The set of blades 440 is preferably rotatably mounted to the blade platform 420. More preferably, the set of blades 440 is statically mounted to a driveshaft 460, wherein the driveshaft 460 rotates relative to the blade platform 420. However, the set of blades 440 can be directly mounted to the blade platform 420, rotate relative to each other, or be otherwise configured.

The set of blades 440 can include one or more blades. Multiple blades can have the same geometry, or have different geometries. The blades can taper toward a blade tip, curve toward a blade tip, have a bent blade tip, taper toward a leading edge, twist about a longitudinal axis, be flat, be triangular, rectangular, or have any other suitable geometry. The blades can be arranged offset along the driveshaft 460, be arranged in-line, or have any other suitable relative relationship. The blades can be arranged with the tips extending outward from the blade platform 420 (e.g., distal the blade platform 420), but can alternatively be arranged with the tips extending inward toward the blade platform 420 or be arranged in any other suitable orientation.

6.3. Driveshaft

The driveshaft 460 of the blade assembly 400 functions to operatively connect the blades to the blade actuator 800. The driveshaft 460 is preferably removably couplable to the blade actuator 800, such that the driveshaft 460 is disconnected from the blade actuator 800 when the blade assembly 400 is in the disengaged position 424, and drivably connected to the blade actuator 800 when the blade assembly 400 is in the engaged position 422. Alternativley, the driveshaft 460 can be permanently coupled (e.g., mounted, formed as a singular piece) to the blade assembly 400, the blade actuator, the blade platform, the container platform, or be otherwise coupled to any other suitable system component.

The driveshaft 460 preferably rotatably mounts the set of blades 440 to the blade platform 420, but can alternatively statically connect the blades to the blade platform 420 or otherwise relate the blades with the blade platform 420. The driveshaft 460 preferably extends through the driveshaft bore in the blade platform 420, but can alternatively terminate at the blade platform 420 (e.g., wherein the driveshaft 460 only extends from the processing face of the blade platform 420 outward) or be otherwise configured. The driveshaft 460 preferably extends perpendicular the blade platform 420 (e.g., normal to the blade platform 420), but can alternatively extend at any other suitable angle. The driveshaft 460 preferably freely rotates relative to the blade platform 420 about the driveshaft longitudinal axis (rotational axis), but can alternatively be statically coupled to the blade platform 420. The driveshaft 460 can remain axially static relative to the blade platform 420, freely actuate along an axis substantially parallel the rotational axis relative to the blade platform 420, actuate within a limited range along the rotational axis, or be otherwise axially coupled to the blade platform 420.

The driveshaft 460 preferably defines a blade end 462 and an actuator engagement end 464 (e.g., motor engagement end) opposing the blade end 462. The blade end 462 mounts the set of blades 440, and is preferably arranged proximal the processing face and/or container platform 300 (e.g., arranged within the blade recess 426), but can alternatively be arranged elsewhere. The actuator engagement end 464 functions to selectively engage with the blade actuator 800, and is preferably arranged distal the processing face and/or container platform 300 (e.g., arranged proximal the blade actuator 800), but can alternatively be arranged elsewhere. In particular, the actuator engagement end 464 functions to engage the blade actuator 800 in the engaged position 422 (e.g., such that the driveshaft 460 can transfer processing, or rotational, force from the blade actuator 800o to the blades on the blade end 462), and is disengaged from the blade actuator 800 in the disengaged position 424. However, the driveshaft 460 can be otherwise configured. The actuator engagement mechanism can be a mechanical engagement mechanism, an electromagnetic engagement mechanism (e.g., magnets, electrostatic attraction, etc.), an adhesive, or include any suitable coupling mechanism. The driveshaft can pivot about an external pivot point to engage with the actuator, traverse linearly to engage with the actuator, rotate about the longitudinal axis to engage with the actuator, or otherwise actuate to engage with the actuator.

The actuator engagement end 464 can engage with the blade actuator 800 along an interior surface, along an exterior surface, along a broad face of the end (e.g., perpendicular a driveshaft 460 longitudinal axis), or engage with the blade actuator 800 along any other suitable surface. The engagement surface is preferably splined, but can alternatively include threads, be smooth, or include any other suitable set of features.

The actuator engagement end 464 is preferably profiled. Because the blade actuator 800 and driveshaft 460 engage along an arcuate direction of travel (arcuate engagement path), unlike conventional systems, which engage in an axial direction, the motor and blade can suffer from misalignment issues, which can lead to interface wear or system failure.

Figure 8A:
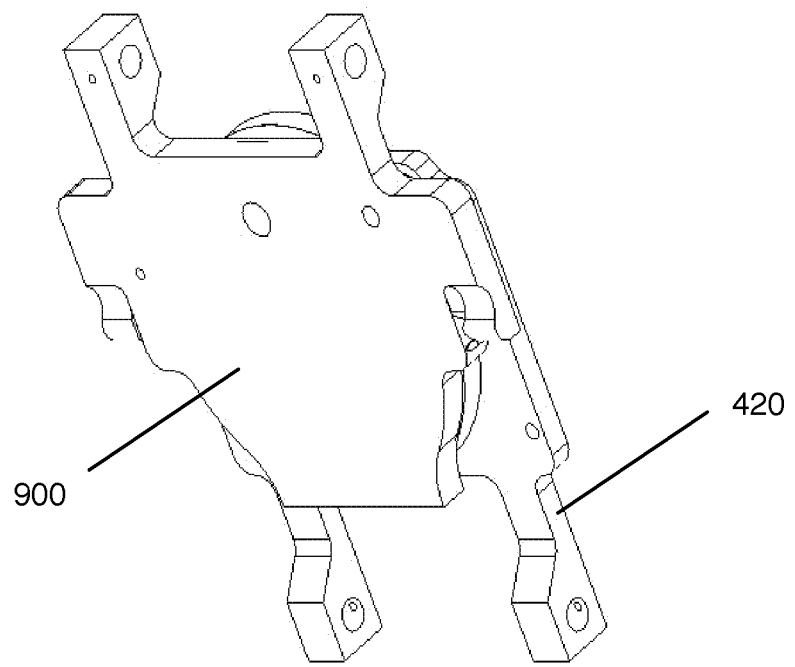
FIGS. 8A and 8B are an isometric view and side view of a blade shield coupled to a blade assembly.
Figure 8B:
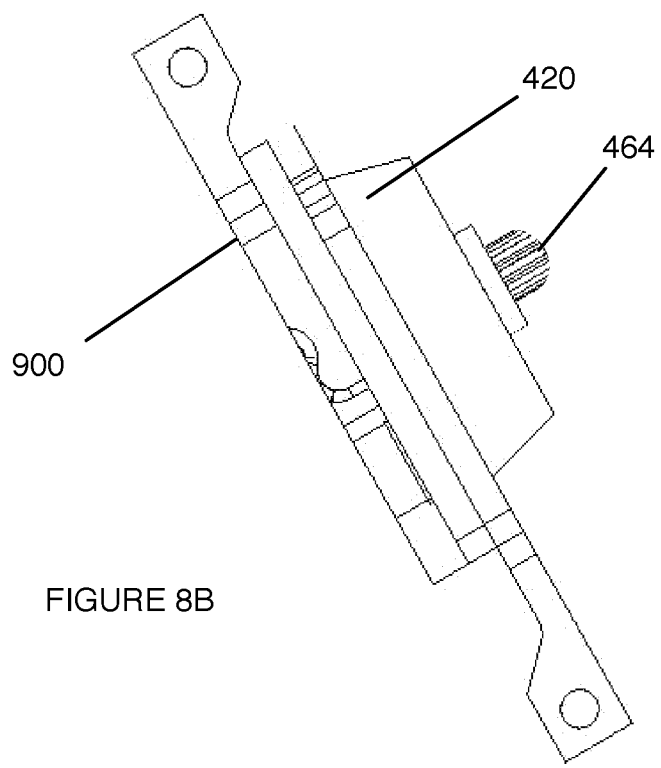

In one variation, as shown in FIG. 8B, the blade assembly 400 includes a driveshaft 460 with a convex, rounded surface that interfaces with the blade actuator 800. The radius of the rounded actuator engagement end 464 is preferably determined based on the radius of the arcuate travel path (e.g., be calculated from the path radius or substantially match the path radius), but can alternatively have any other suitable radius. The rounded actuator engagement end 464 can include a dome (e.g., a spherical cap), a cylinder with rounded edges, a cylinder with filleted edges, or have any other suitable profile. Alternatively, the actuator engagement end 464 can be prismatic with sharp, rounded, or filleted edges, or have any other suitable shape.

Figure 4:
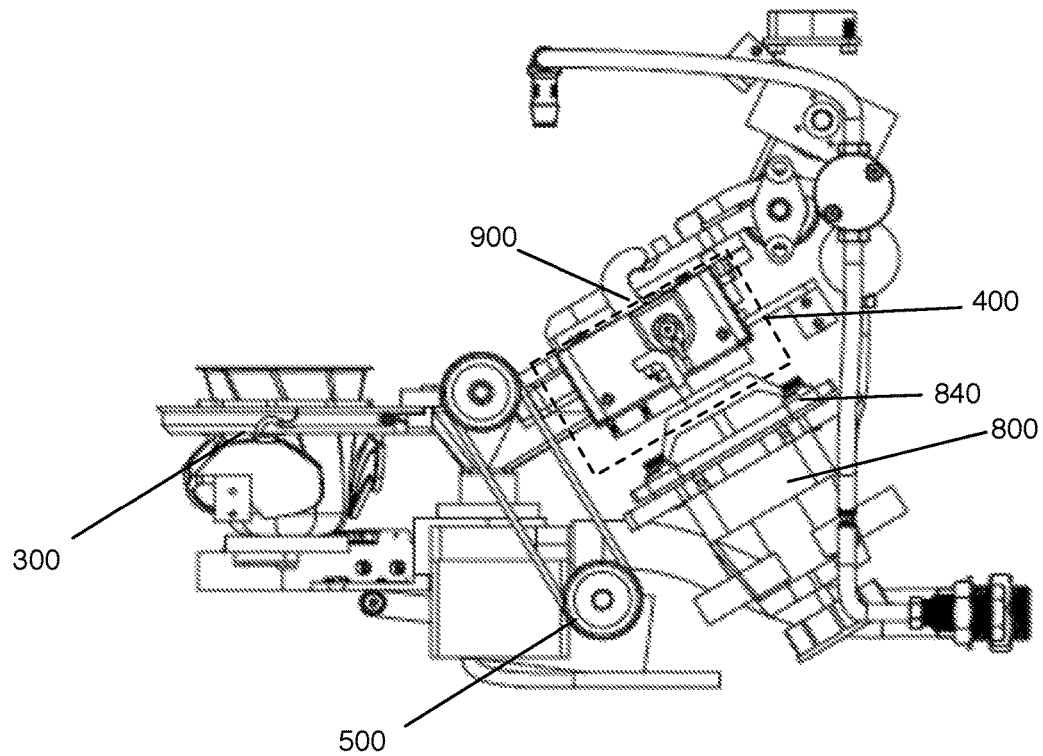
FIG. 4 is a profile view of an example of the system components.
Figure 5:
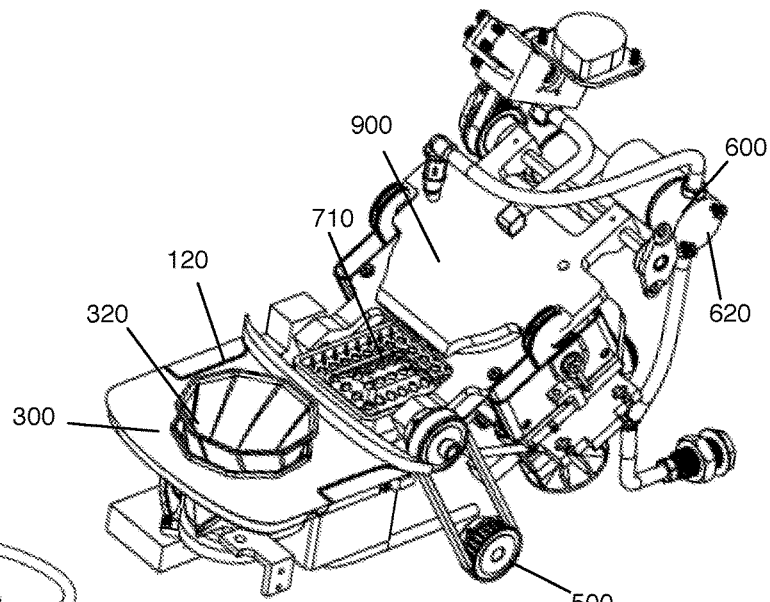
FIG. 5 is an isometric view of an example of the system components, with the blade shield in the clean position.
Figure 6:
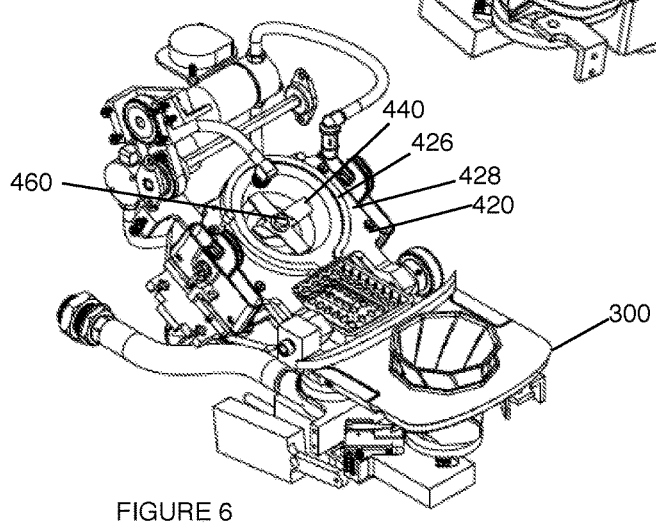
FIG. 6 is an isometric view of an example of the system components, with the blade shield removed.

Alternatively and/or additionally, as shown in FIGS. 4, 11, and 12, the misalignment between the blade actuator 800 and driveshaft 460 can be accommodated by a compliant interface 840. The compliant interface 840 can be arranged at the blade actuator 800 (e.g., such that the blade actuator 800 can move relative to the housing 200 and blade assembly 400), be arranged at the blade assembly 400 (e.g., such that the pivot point includes the compliant interface 840), and/or be assembled to any other suitable component. The compliant interface 840 can include a set of springs (e.g., one or more) biasing the coupled component away from or toward the housing 200, a set of magnets (e.g., one or more) biasing the coupled component away from or toward the housing 200, a set of dampers, foam, a motor actively changing the angle of the component relative to the housing 200 (e.g., the same motor as the blade actuator 800, blade platform 420 actuator, and/or container platform actuator, or be a separate motor), or be any other suitable interface capable of adjusting the angle of the component relative to the housing 200. The compliant interface 840 can be mounted to the housing 200 and the component, or be mounted to any other suitable set of mounting points.

In one example, the blade actuator platform is spring-loaded, such that it can actuate in one or more directions. In this example, the blade actuator platform includes one or more springs biasing the blade actuator 800 toward the driveshaft 460. Blade assembly 400 compression against the blade actuator platform can adjust the angle of the blade actuator platform relative to the driveshaft 460, such that the longitudinal axis of the driveshaft 460 is substantially aligned with the longitudinal axis of the motor interface. The mount can include two springs located along the mount edge proximal the base, one spring centered along the mount edge proximal the base, or any suitable number of springs arranged in any configuration. The blade actuator platform can additionally include an extension that protrudes beyond the motor interface, such that the blade platform 420 contacts and applies a depression force to the extension, instead of prior to contact force application to the motor interface. However, the blade platform 420 can be mounted on springs, or any other suitable compliant interface 840 can be used.

6.4. Blade Assembly Sensors

The blade assembly 400 can additionally include a set of sensors that function to report the operation parameter values of the blade assembly 400. More preferably the sensors are configured to measure the operation parameter values of the processing chamber 142 and/or cleaning chamber 162 (e.g., wherein the sensors are connected to or arranged proximal the processing face of the blade platform 420), but can alternatively measure the tilt or any other suitable operation parameter of the blade assembly 400. The sensors can include flow sensors (e.g., configured to measure the flow rate within the processing chamber 142 or cleaning chamber 162), temperature sensors, pressure sensors, cameras, optical sensors, orientation sensors (e.g., accelerometer, etc.), rotary sensors, or include any other suitable sensor.

6.5. Locking Mechanism

The locking mechanism 480 of the blade assembly 400 transiently locks the blade platform 420 to the container platform 300. Locking the blade platform to the container platform can seal the blade platform 420 against an adjacent lip of the container 120 in the first position. Generally, the locking mechanism 480 functions to transiently and selectively lock the container platform 300 to the blade platform 420.

Figure 7:
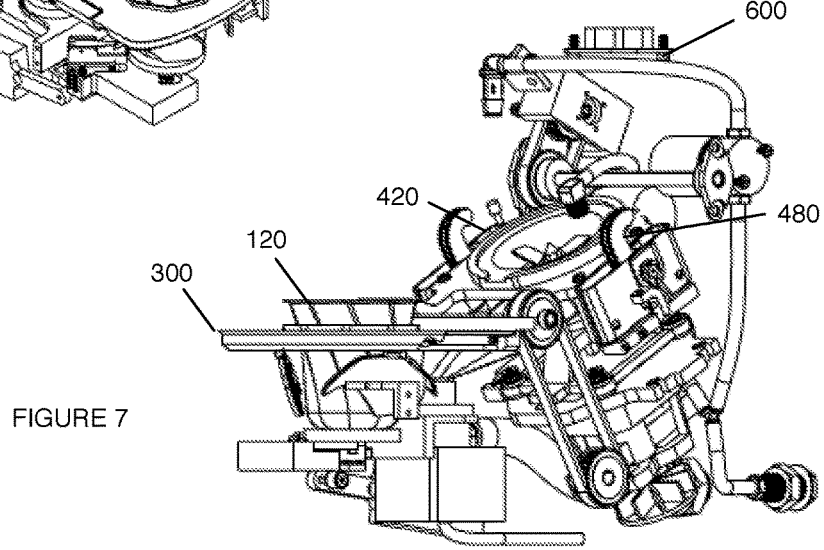
FIG. 7 is an isometric view of an example of the system components, with the blade shield removed.

As shown in FIG. 7, the locking mechanism 480 can be coupled to the blade platform 420 and engage a corresponding feature (e.g., a bolt, cutout, hook, etc.) arranged on the container platform 300 to lock the blade platform 420 to the container platform 300 during a blend cycle and/or bias the blade platform 420 against the container platform 300. In particular, the locking mechanism 480 can engage the feature on the container platform 300 to lock the blade platform 420 to the container platform 300 as the blade platform 420, container 120, and container platform 300 are pivoted—as a unit—into the second position, the blender blade is spun to blend the contents of the container 120, and as the blade platform 420, container 120, and container platform 300 are pivoted—as a unit—back into the first position before separation of the blade platform 420 from the container platform 300 to enable removal of the container 120—and its blended contents—from the automated food processing system. The locking mechanism 480 can also engage a similar feature on the blade shield 900 during a clean cycle. For example, the locking mechanism 480 can be actuated once the blade shield 900 reaches the clean position to lock the blade shield 900 to the blade platform 420, thereby sealing the blade shield 900 to the blade platform 420 as cleaning fluid is injected toward the blender blade and the blender blade spun during the clean cycle. However, the locking mechanism 480 can be coupled to any other suitable component.

In one implementation, the locking mechanism 480 includes an electromechanical pull latch operable between an unlatched position and a latched position. In this implementation, the locking mechanism 480 includes a hooked latch that, when actuated from the unlatched position into the latched position, rotates toward an adjacent latching feature (arranged on the container platform 300 or on the blade shield 900) and then draws linearly back into a housing 200 of the locking mechanism 480 to pull the latching feature inward toward the housing 200, thereby drawing adjacent faces of the blade platform 420 and the container platform 300 together during a blend cycle and drawing adjacent faces of the blade platform 420 and the blade shield 900 together during a clean cycle. Subsequently, when the locking mechanism 480 actuated from the latched position back into the unlatched position, the hooked latch moves linearly away from housing 200 and the rotates away from the adjacent latching feature, the hooked latch thus clearing the latching feature and enabling the blade platform 420 to separate from the container platform 300 during a blend cycle and enabling the blade platform 420 to separate from the blade shield 900 together during a clean cycle. As in this implementation, the automated food processing system can include any number of locking mechanisms 480 coupled to the blade platform 420 and engaging corresponding features (e.g., bolts) on the container platform 300 and/or the blade shield 900. Alternatively, one or more locking mechanisms 480 can be arranged on the container platform 300 and engage corresponding features on the blade platform 420 to lock the container platform 300 to the blade platform 420, and one or more locking mechanisms 480 can be arranged on the blade shield 900 and engage the same or different features on the blade platform 420 to lock the blade shield 900 to the blade platform 420. However, the locking mechanism 480 can include a magnetic locking mechanism 480, an adhesive locking mechanism 480, or include any other suitable locking mechanism 480.

6.6. Egress Manifold and Trough

As shown in FIGS. 3 and 13, the blade platform 420 can also define an egress manifold 700 (e.g., spout) that functions to fluidly connect the processing chamber 142 with a drain or fluid outlet. The egress manifold 700 can additionally or alternatively function as a pressure equalizer (e.g., vent). The egress manifold 700 can be a vertical recess extending from the blade recess 426 to an edge of the platform, wherein the platform edge is arranged over a trough 710 (or drain) supported in the housing 200. In particular, the egress manifold 700 allows cleaning fluid (wash fluid, rinse water)—injected between the blade platform 420 and the blade shield 900 to clean the blender blade during a clean cycle—to drain from the blade recess 426 in the blade platform 420 downward into the trough 710 after the cleaning cycle.

The egress manifold 700 can be a tube, pipe, hole in the cavity, or have any other suitable configuration, and can be unobstructed, include a valve (e.g., one way or two way valve configured to control fluid flow from the system interior to or from the system exterior), vent, or any other suitable flow regulation mechansim. The egress manifold can be operable between an open position that permits fluid flow therethrough, and a closed postion that prevents fluid flow therethrough or prevents flow of selective fluids therethrough. The egress manifold operation can be passively controlled (e.g., by pressure differentials), actively controlled (e.g., by a motor, electromagnetic coupling mechanism, etc.), or otherwise controlled.

The egress manifold 700 can be cooperatively defined by the blade platform 420 and the blade shield 900, entirely defined by the blade platform 420, or be defined in any other suitable manner. In one variation, the egress manifold 700 can be defined along the pivot edge of the blade platform 420. In a second variation, the egress manifold 700 can be defined along the blade shield 900 edge proximal the pivot edge of the blade platform 420. In a third variation, the egress manifold 700 can be defined through the thickness of the blade platform 420 (e.g., perpendicular or at any other suitable angle to the processing face). However, the egress manifold 700 can be arranged in any other suitable configuration. The egress manifold 700 is preferably fluidly connected to the engagement region (e.g., fluidly connected to the blade recess 426), but can alternatively be fluidly isolated from the engagement region and be arranged in any other suitable position.

In one variation, the spout can face the container platform 300 and can be sealed outside of the container 120 and the seal in the blade platform 420 when the blade platform 420 is locked to the container platform 300, and the spout can face substantially upward (e.g., 300 from horizontal) when the blade platform 420 moves to the engaged position 422 after returning the container platform 300 and container 120 with blended contents to the disengaged position 424 prior to initiating a clean cycle. With the blade platform 420 facing upward with the blade platform 420 in the engaged position 422 upon initiating of a clean cycle, the blade shield 900 can move into the clean position in which the perimeter of the clean container 120 substantially seals against the exposed face of the blade platform 420 without substantially obstructing the spout such that cleaning fluid injected toward the blade during the clean cycle drains out of the volume between the blade shield 900 and the blade platform 420 substantially exclusively via the spout.

The automated food processing system can additionally include a trough 710 that collects food waste and waste water from left over from blend and clean cycles executed on the automated food processing system. In one implementation, the trough 710 defines an open end that extends longitudinally within the automated food processing system between a trailing edge of the container platform 300 in the first position adjacent the blade actuator 800: such that cleaning fluid can drain from the spout into the trough 710 below; and such that any blended matter that falls from the receiver of the blade platform 420—as the blade platform 420 moves from the first position back to the second position to reveal the container 120 and its blended contents for removal from the automated food processing system at the end of a blend cycle—falls into the trough 710. The trough 710 can therefore also define a width substantially similar to or greater than a width of the receiver of the blade platform 420 to substantially ensure that any blended matter falling from the blade platform 420—but missing the container 120 as the blade platform 420 moves from the first position to the second position—is captured by the trough 710. The trough 710 can thus collect food waste collected from the blade platform 420 during a blend cycle and wash and rinse fluid collected from the blade platform 420, the blender blade, and the blade shield 900 during a rinse cycle. The trough 710 can further dispense of this waste from the automated food processing system by funneling this waste into a residential or commercial drain in a space in which the automated food processing system is located or installed. For example, the water dispenser can tap into a city water supply, and the trough 710 can tap into a city sewer system, the city water supply and city sewer system both provided in a building or space occupied by the automated food processing system. However, the trough, water dispenser, or any other suitable fluid containing volume can be fluidly connected to any other suitable fluid source or sink. However, the trough 710 can be of any other form arranged in any other way within the automated food processing system and can dispense of food waste and waste water from the automated food processing system in any other suitable way.

7. Platform Actuator

The platform actuator 500 of the automated food processing system is coupled to the blade platform 420, and functions to pivot the blade platform 420 from the engaged position 422 into the disengaged position 424. The platform actuator 500 can additionally pivot the blade platform 420, the container 120, and the container platform 300, locked to the blade platform 420 by the locking mechanism 480, between a first position and a second position (e.g., the disengaged and engaged positions, respectively; the processing and loading positions 302, respectively). Alternatively, a container platform actuator separate from the platform actuator 500 can actuate the container platform 300 between the loading and processing positions 304. Generally, the platform actuator 500 functions to move the blade platform 420 between the engaged position 422 and the disengaged position 424 during a food processing cycle (e.g., blending cycle).

The platform actuator 500 can be a motor, such as an electric motor; a handle (e.g., wherein the platform is manually actuated, or be any other suitable force-generating mechanism. The electric motor can be a DC motor or an AC motor. Examples of the electric motor include a brushed DC motor, an electronic commutator motor, a universal AC-DC motor, an induction motor, a synchronous motor, a doubly fed electric machine, a rotary motor, a linear motor, or be any other suitable motor. The platform actuator 500 can be drivably coupled to the blade platform 420 and/or container platform 300 by a coupling mechanism. The coupling mechanism can be an angular gear drive, bevel drive, belt gear, worm gear, or be any other suitable force transfer mechanism.

In one example of platform actuator operation, at the start of a blend cycle, the blade platform 420 is arranged in the engaged position 422 with the blender assembly engaged with the blade actuator 800, and the container platform 300 is arranged in the loading position 302 (i.e., the first position), thus separated (e.g., angularly offset) from the blade platform 420. Once insertion of a new container 120 into the container platform 300 is detected, once a blend cycle input is entered in the automated food processing system, or once any other suitable blend cycle start event is detected, the platform actuator 500 can apply a torque to the blade platform 420 to rotate the blade platform 420 into the first position over the container platform 300. The locking mechanism 480 can then latch the blade platform 420 to the container platform 300 with the container 120 constrained therebetween. Once the blade and container platforms 300 are latched, the blade actuator 800 can apply a torque to the blade platform 420 in an opposite direction to pivot the container platform 300, the container 120, and the blade assembly 400—in unit—to the second position, in which the driveshaft 460 of the blade assembly 400 engages the blade actuator interface 820 (blade actuator 800 output shaft). In the second position, the container 120 is thus supported in a substantially inverted orientation by the blade and container platforms 300. For example, opposing adjacent faces of the blade and container platforms 300 can be arranged at a 30° angle from horizontal in the second position.

Once the contents of the container 120 are processed (e.g., blended, by actuating the blade actuator 800 coupled to the blade for a period of time), the platform actuator 500 then pivot the container platform 300, the container 120, and the blade assembly 400—in unit—back into the second position, and the locking mechanism 480 unlatches the container platform 300 from the blade assembly 400. With the blade platform 420 now released from the container platform 300, the platform actuator 500 pivots the blade assembly 400 back into the second position adjacent the blade actuator 800, such that the blade assembly 400 is separated from the container platform 300, and such that the container 120 (now with blended contents) is revealed and accessible for retrieval from the automated food processing system by a user.

The platform actuator 500 can therefore include a rotary actuator that is directly or indirectly coupled to the blade platform 420 to move the blade platform 420 (and other latched components of the automated food processing system) between the first and second positions. For example, the blade platform 420 can be locked to an axle, the container platform 300 can be bushed on the axle and therefore pivot about the axle independently of the axle, and the platform actuator 500 can include an electric gearhead motor coupled to the axle by a timing belt that communicates torque from an output shaft of the electric gearhead motor into the axle to pivot the blade platform 420. However, the platform actuator 500 can be any other suitable type of actuator and can selectively rotate and/or translate the blade platform 420, the container platform 300, and/or the container 120 between the first and second positions in any other suitable way.

7.1. Platform Actuator Sensors

The automated food processing system can further include one or more sensors that detect a position of the blade platform 420, the container platform 300, and/or the platform actuator 500 to inform control of the platform actuator 500. The sensors can include switches (e.g., limit switches, tilt switches, pressure switches, toggle switches, etc.), rotary encoders (e.g., conductive encoders, optical encoders, on-axis magnetic encoders, off-axis magnetic encoders, etc.), or include any other suitable sensor. The platform actuator 500 sensors are preferably connected to the platform actuator 500, but can alternatively be connected to the force transfer mechanism, the blade assembly 400 (e.g., the blade platform 420), or be connected to any other suitable component. The platform actuator 500 sensors are preferably connected to the processor 180, but can alternatively be connected (e.g., wirelessly or through a wired connection) to any other suitable control system.

For example, the automated food processing system can include various limits switches, and a processor 180 (or similar controller) arranged within the automated food processing system can trigger the platform actuator 500 to pivot the blade platform 420 from the first position toward the second position until the blade platform 420 contacts a second limit switch, thereby indicating that the blade platform 420 has fully entered the second position. Subsequently, in this example, the controller can trigger the platform actuator 500 to pivot the blade actuator 800 from the second position back toward the first position (as in Block S140) until the blade platform 420 contacts a first limit switch, thereby indicating that the blade platform 420 has fully entered the first position. (The automated food processing system can similarly include a third and a fourth limit switch that indicate the limits of the blade shield 900 between a clean position and a retracted position, and the processor 180 can control an actuator to move the blade shield 900 between these positions accordingly.) Alternatively, the automated food processing system can incorporate one or more optical trip sensors, linear or rotary encoders, a Hall effect sensors, or any other suitable type of sensor(s) to detect the position of the blade platform 420 (and/or other component) within the automated food processing system, and the processor 180 within the automated food processing system can trigger an actuator to move one or more elements of the automated food processing system between positions in any other way or according to any other schema.

8. Blade Actuator

As shown in FIG. 3, the blade actuator 800 of the automated food processing system functions to actuate (e.g., rotate) the blades. The blade actuator 800 preferably selectively engages the blades when the blade assembly 400 is in the engaged position 422, and is selectively disengaged from the blades when the blade assembly 400 is in the disengaged position 424. Generally, the blade actuator 800 functions to spin the blades to blend contents within the container 120 when the blender blade is engaged with the blade actuator 800 in the engaged position 422. Alternatively, the blade actuator 800 can be permanently mounted to the blade platform, blades, or be otherwise configured.

The blade actuator 800 can be a motor, such as an electric motor, but can alternatively be any other suitable force-generating mechanism. The electric motor can be a DC motor or an AC motor. Examples of the electric motor include a brushed DC motor, an electronic commutator motor, a universal AC-DC motor, an induction motor, a synchronous motor, a doubly fed electric machine, a rotary motor, a linear motor, or be any other suitable motor. The blade actuator 800 can be retained by a blade actuator platform, to the housing 200, or to any other suitable component. The blade actuator 800 is preferably statically mounted to the mounting surface, but can alternativley actuate relative to the blade assembly 400, or be retained in any other suitable manner. The blade actuator platform can be coupled to the housing 200 by a compliant interface 840, as discussed above; statically mounted to the housing 200; or otherwise coupled to the housing 200.

The blade actuator 800 can additionally include a blade actuator interface 820 that functions to drivably engage with the blade assembly 400. The blade actuator interface 820 can be an output shaft, complimentary magnet, or be any other suitable force transfer mechanism configured to transfer a rotary force generated by the blade actuator 800 to the blade assembly 400 (e.g., the driveshaft 460 and/or set of blades 440).

For example, the blender blade can include an electric motor with an output shaft configured to transiently engage the blade actuator 800 (e.g., only when the blade platform 420 is in the second position) and to communicate torque into the blender blade when the blender blade and the blade actuator 800 are engaged. The blade actuator 800 can rotate the blender blade according to a particular blend time, a particular blend formulae (e.g., pattern), a particular blend schema, or any other suitable set of operation parameters to process the contents of the container 120. For example, the blade actuator 800 can rotate the blender blade continuous as a maximum power or rotation rate (e.g., 4000 rpm) for a preset period of time (e.g., ten seconds). In another example, the blade actuator 800 can pulse rotation of the blender blade between off and maximum power, such as 'full-power' for one second, off for one-half of one second, and repeat this for ten cycles. In yet another example, the blade actuator 800 can ramp the blender blade from static up to maximum speed (or maximum power) and then back down to static smoothly over a period of time (e.g., twelve seconds). However, the blade actuator 800 can implement any other blend schema or cycle.

The blade actuator 800 can execute the same processing schema for each fresh container 120 loaded into the automated food processing system, for each container 120 containing the same type of food (e.g., one processing schema for all smoothies and another processing schema for baby foods), or uniquely for each container 120 or user, etc. For example, the blade actuator 800 can rotate the blade at a first speed (e.g., 4000 rpm) for a first time (e.g., ten seconds) for a smoothie to achieve a desired consistency of the smoothie (i.e., emulsion), and the blade actuator 800 can rotate the blade at a second speed (e.g., 60 rpm) for a second time (e.g., thirty seconds) for oatmeal to achieve a desired level of mixing of the oatmeal grains with milk, cinnamon, and sugar. However, the blade actuator 800 can include any other suitable type of actuator that spins the blade to mix or blend, etc. the contents of the container 120 according to any other suitable schema.

The blade actuator 800 can additionally be waterproofed or water-resistant. The blade actuator 800 can be enclosed within a waterproof or water-resistant enclosure, coated with a hydrophobic coating, made from or include hydrophobic materials, incorporate one-way water-selective membranes or valves that drain water out of the motor enclosure, or include any other suitable water management system.

The system 100 can additionally include soundproofing mechanisms that function to reduce the amount of generated or emitted noise from the system 100. Soundproofing mechanisms can include: using a low-sound emission motor, using sound-absorbing material for the cup (e.g., bagasse, bamboo, plastic, etc.), using a low-sound emission blade design, including sound insulation or dampeners in the container 120 holder (e.g., silicone lining, etc.) and/or blade actuator 800, or include any other suitable sound-proofing mechanism.

9. Fluid Dispenser

The fluid dispenser 600 of the automated food processing system dispenses a volume of fluid into a chamber. The chamber can be entirely or partially formed by the blade assembly 400, container, or by any other suitable system component. The fluid can function to wash the chamber and/or constituent components, control the temperature of the chamber contents (e.g., heat, cool, or maintain the temperature of the chamber contents), purge the fluid manifolds or any other suitable component of the system 100, or perform any other suitable functionality. The system can include one or more fluid dispensers, wherein each can serve a different function (e.g., dispense fluids at different temperatures) or serve the same function. The chamber can be a processing chamber 142, cleaning chamber 162, or be any other suitable chamber. The fluid can be liquid, gas, or any other suitable fluid. The fluid can be water (e.g., hot water, cold water, etc.), cleaning fluid (e.g., mixed in-line or at the fluid dispenser 600), oil, juice, flavored water, or any other suitable fluid.

The fluid dispenser 600 can dispense fluid into the chamber (e.g., container 120) in response to insertion of the container 120 into the receiver of the container platform 300 in the first position (loading position 302) or determination of container 120 presence within the container receptacle 320, in response to a predetermined period of time being met (e.g., after 5 minutes has passed since the last rinse), in response to the temperature in the fluid manifold reaching a threshold temperature (e.g., when the temperature in the fluid line falls below 150° F.), in response to blade platform sealing against the container platform, in response to blade platform latch engagement with the container platform, or in response to the occurrence of any other suitable trigger event.

The fluid dispenser 600 preferably includes a fluid manifold fluidly connected to a fluid source 620, but can alternatively include any other suitable fluid connection. The fluid source can be a fluid reservoir, a fluid heater (e.g., connected in-line between a fluid source and the system 100), a fluid generator, a utility (e.g., a city water system), or be any other suitable fluid source. In a specific example, the fluid source can be a water heater configured to heat water to at least 100° F., to between 120° F.-200° F., to approximately 190° F. (within a margin of error, such as 5° F.), or to any other suitable temperature. 190° F. can be preferred in some variations, particularly in applications in which the container 120 is transported and stored in conventional cold chain (e.g., at 0° F.), to bring the container content temperature up to a desired temperature. The fluid source can hold different volumes of fluid at different temperatures, heat the fluid to different temperatures by varying heating time, hold fluid at a single temperature and mix the fluid with lower temperature fluid to change the temperature, or provide fluid at different temperatures in any other suitable manner.

The fluid dispenser 600 can be fluidly connected to the fluid source by a secondary fluid manifold (e.g., an intermediary tube, such as a rigid or flexible tube), directly connected to the fluid source, or be otherwise connected to the fluid source. The secondary fluid manifold can additionally actuate (e.g., pivot at the same point as the blade platform) to minimize stretching. The fluid dispenser 600 can additionally include regulators and/or sensors for pressure, temperature, flow rate, or other fluid parameters connected to the fluid dispenser 600 (e.g., arranged within the fluid dispenser 600, arranged in-line with the fluid dispenser 600, arranged in any other suitable location, etc.). The fluid dispenser 600 can additionally include passive and/or active valves (e.g., check valves, ball valves, etc.) that function to control fluid flow therethrough, one or more water filters, one or more additive manifolds (fluidly connected to additive reservoirs), or include any other suitable component.

The fluid dispenser 600 is preferably fluidly connected to the processing face of the blade platform 420, but can alternatively be fluidly connected to the receiving face of the container platform 300, the lumen of the container receptacle 320, arranged above the container platform 300 in the loading position 302 (e.g., within the volume above the container receptacle 320), or be fluidly connected to any other suitable component. The fluid dispenser 600 can extend through the thickness of the blade platform 420 and terminate within the engagement region (e.g., within the blade recess 426, etc.), extend through the thickness of the container platform 300, extend parallel to the receiving or processing faces, or extend along any other suitable portion of the system 100. The fluid dispenser 600 can be oriented and/or introduce fluid along a normal vector to the receiving or processing faces, along an acute angle to the receiving or processing faces, along a tangent to the blade recess 426 and/or container receptacle 320, or along any other suitable vector. The fluid dispenser 600 can be a separate fluid manifold from the other system components (e.g., be a separate tube), can be defined by the system components, or can be defined in any other suitable manner.

The fluid dispenser 600 can remain substantially static relative to the blade assembly 400, the container platform 300, or the housing 200, or can actuate relative to the blade assembly 400, the container platform 300, or the housing 200. In the latter variation, the fluid dispenser 600 can be actuated by a passive actuator (e.g., a spring, foam, etc.) or an active actuator (e.g., a motor).

In a first variation, the fluid dispenser 600 extends through the blade platform thickness to the blade recess 426, normal to the planar portion of the processing face. The fluid dispenser 600 can terminate proximal the driveshaft 460, proximal the perimeter of the engagement region, or terminate at any other suitable location. In a second variation, the fluid dispenser 600 extends through the blade platform 420 at an angle to the planar portion of the processing face, and terminates at an angle within the blade recess 426. In this variation, the fluid dispenser 600 is configured to direct fluid along a tangential vector within the blade recess 426, in a swirl pattern. However, any other suitable fluid dispenser 600 arranged in any other suitable configuration can be used.

In one specific example, the fluid dispenser 600 includes a water line that connects to a commercial or residential water supply with a kitchen, office, or other space occupied by the automated food processing system. In this example, the water dispenser can include a pressure regulator, a valve, and a spigot, wherein the pressure regulator regulates water pressure from the commercial or residential water supply (e.g., at 50 psi) down to an internal-use pressure (e.g., 30 psi), and wherein the valve is selectively actuated for discrete periods of time to meter a particular volume of fluid from the pressure regulator, through the spigot, into the container 120. The spigot can include a rigid water line pivotably suspended over and directed downward toward the receiver of the container platform 300 to dispense the volume of water from the valve directly into the container 120. Alternatively, the spigot can include a flexible line extending downward over and directed toward the receiver of the container platform 300. In one example implementation, the spigot is coupled to an access door 220 of the automated food processing system via a mechanism such that, when the access door 220 is opened by a user to load a fresh container 120 into the container platform 300, the mechanism moves the spigot out of the way of the path of the container 120 into the automated food processing system. Similarly, when the blade platform 420 moves into the first position over the container platform 300, the blade platform 420 can push the spigot out of its the path. Alternatively, the spigot can be coupled to an actuator that moves the spigot between a dispense position over the container 120 and a retracted position out of the way of a container 120 and/or blade platforms 420 and out of the way of insertion or removal of a container 120 into or out of the container platform 300. Yet alternatively, the spigot can be integrated into the container platform 300 to dispense water into the container 120 once the container 120 is loaded into the automated food processing system or integrated into the blade platform 420 to dispense water into the container 120 once the blade platform 420 is arranged over the container platform 300 in the first position. However, the spigot can be arranged in any other way within the automated food processing system to dispense water into the container 120.

The fluid dispenser 600 can supply the volume of fluid into the container 120 in response to detected insertion of a new container 120 into the container platform 300, in response to closure of the door 220 through which the new container 120 was loaded into the automated food processing system, in response to selection of a "start" button or a menu selection on the automated food processing system (or a device in communication with the automated food processing system), in response to opening of the door 220, in response to removal of the container from the container receptacle, in response to a predetermined time duration having passed, or in response to any other suitable event.

In a specific example, the fluid dispenser 600 dispenses a first volume of fluid at a first temperature for a first time duration into a processing chamber cooperatively formed between a container and the blade platform in response to blade platform sealing against the container. The fluid dispenser 600 dispenses a second volume of fluid at a second temperature (e.g., 140F-160F) for a second time duration into a wash chamber cooperatively formed between the blade shield and the blade platform in response to door actuation (e.g., door opening) to rinse the blades and processing face. The fluid dispenser 600 dispenses a third volume of fluid at a second temperature (e.g., 180F) for a third time duration (e.g., 30 seconds) into the wash chamber in response to a predetermined time threshold (e.g., 4 hours) being met.

The processor 180 of the automated food processing system can additionally control the volume, flow rate, pressure, duration, and/or any other suitable fluid parameter of the dispensed fluid. For example, the processor 180 can further trigger the valve (e.g., a solenoid valve) to open for a preset period of time (e.g., three seconds) to portion a particular preset volume of fluid into the container 120. The processor 180 can also adjust the length of time that the valve is opened—and therefore the amount of fluid dispensed into the container 120—such as based on a menu selection entered by the user (e.g., for a consistency of the emulsion), based on a type of food solid contained in the container 120, based on a menu or command read from the container 120, etc. However, the water dispenser can function in any other way and include any other suitable component arranged in any other way to dispense.

10. Blade Shield

One variation of the automated food processing system further includes: a blade shield 900 transiently operable in a clean position and substantially enveloping the blender blade in the cleaning position during a clean cycle; the cleaning fluid injector configured to inject a volume of cleaning fluid into the blade shield 900 and toward the blender blade during the clean cycle; and the drain (or trough 710, as described above) adjacent the blade actuator 800 and receiving the volume of cleaning fluid from the blade shield 900 via the spout. Generally, the blade shield 900, fluid injector, and drain cooperatively function to automatically clean the blender blade and the blade platform 420—both of which may contact food during a blend cycle—upon completion of a blend cycle.

In one implementation, the blade shield 900 is coupled to an actuator that actuates (e.g., pivots, actuates axially, etc.) the blade shield 900 from the retracted position into the clean position over the blade platform 420 upon completion of a blend cycle. The blade shield 900 can include a rigid housing 200 that seals against a face of the blade platform 420, such as between an outer perimeter of the blade platform 420 and the perimeter of the blade recess 426 in the blade platform 420, to prevent egress of cleaning fluid from between the blade platform 420 and the blade shield 900. For example, the blade shield 900 can define an inverted polymer bucket defining a rim that seals against the elastomeric layer arranged across the blade platform 420. The elastomeric layer can therefore function both to: seal the rim of the container 120 to the blade platform 420 during a blend cycle; and to seal the blade shield 900 to the blade platform 420 during a clean cycle. However, the blade shield 900 can be of any other form and can engage the blade platform 420 in any other suitable way.

The cleaning fluid injector can be the fluid dispenser 600, or be a separate fluid manifold. The cleaning fluid can be the same fluid introduced into the processing chamber 142 (e.g., water), the fluid supplied by the fluid dispenser 600 with a cleaning additive, be a different fluid from a different fluid source, or be any other suitable fluid having any other suitable composition.

The cleaning fluid injector can include: a T-fitting that taps into the fluid line between the regulator and the valve of the fluid dispenser 600 described above; a nozzle extending through (or coextensive with) the blade shield 900; a flexible line coupled to the nozzle; and a valve arranged between the flexible line and the T-fitting and actuatable to release fluid (e.g., water) toward the blade during a clean cycle. The cleaning fluid injector can also include a soap dispenser than selectively releases a food-safe soap into the valve or into the flexible line during a clean cycle.

The clean cycle is preferably implemented (e.g., by the processor 180 or other computing system) in response to determination of container 120 removal from the container receptacle 320, but can alternatively be implemented in response to a predetermined number of processing cycles being met (e.g., after 5 containers 120 have been blended), in response to a predetermined time duration being met (e.g., after 4 hours has passed since the last clean cycle), or be implemented in response to the occurrence of any other suitable trigger event. The clean cycle can be a rinsing cycle, a sanitizing cycle, or be any other suitable cleaning cycle. In a specific example, the rinsing cycle includes a hot water rinse at 150° F. after every new container has been removed, and a sanitizing cycle includes a 180° F. rinse for 30 seconds every several hours. However, the clean cycle can be otherwise performed at any other suitable temperature, pressure, frequency, and duration.

The other components can additionally be operated during the clean cycle. For example, during a clean cycle, the blade actuator 800 can spin the blender blade (e.g., at full- or half-speed), the (first) valve can open for a full clean cycle period (e.g., ten seconds) to release water from the regulator toward the blender blade now enshrouded by the blade shield 900), and a second valve arranged between the soap dispenser and the flexible line can open for a limited period of time less than the duration of the clean cycle period (e.g., five seconds) to release soap into the water moving toward the blade. Thus, soapy water can enter the volume between the blade shield 900 and the blade platform 420 to clean (e.g., sanitize) the blender blade and the blade platform 420, as in a "wash cycle." In this example, the second valve can then close during the remaining portion of the clean cycle period (e.g., for the remaining five seconds of the clean cycle period) such that only clean, fresh water enters the volume between the blade platform 420 and the blade shield 900 to rinse soapy water and any other remaining food waste from the volume, as in a "rinse cycle." The cleaning fluid injector can alternatively include one nozzle, one flexible line, and one (or more) valves selectively dispensing cleaning solution (e.g., soapy water) into the volume (as in a wash cycle) and one nozzle, one flexible line, and one (or more) valves selectively dispensing rinse water (e.g., fresh water) into the volume (as in a rinse cycle). Furthermore, both wash and rinse fluid can then drain from the volume, through the spout in the blade platform 420, into the trough 710 (or drain).

During the clean cycle, the cleaning fluid injector can inject or dispense fluid (e.g., cleaning fluid, rinse fluid) directly toward the blender blade as the blade actuator 800 spins the blender blade in a forward direction. The blender actuator can also pulse to intermittently spin the blender blade, spin the blender blade backward, or actuate the blender blade in any other way and according to any other schema or schedule during a clean cycle.

Upon completion of the clean cycle, the blade shield 900 can remain in the clean position to shield a user from contact with the blade during insertion of a subsequent container 120, and the blade shield 900 can then retract from the blade platform 420 to enable the blade platform 420 to pivot into the first position over the container platform 300 at the start of a subsequent blend cycle. However, the system 100 can include any other suitable cleaning mechanism configured to clean the blades and/or blade assembly 400 of the system 100.

11. Processor and Power Source.

Figure 10:
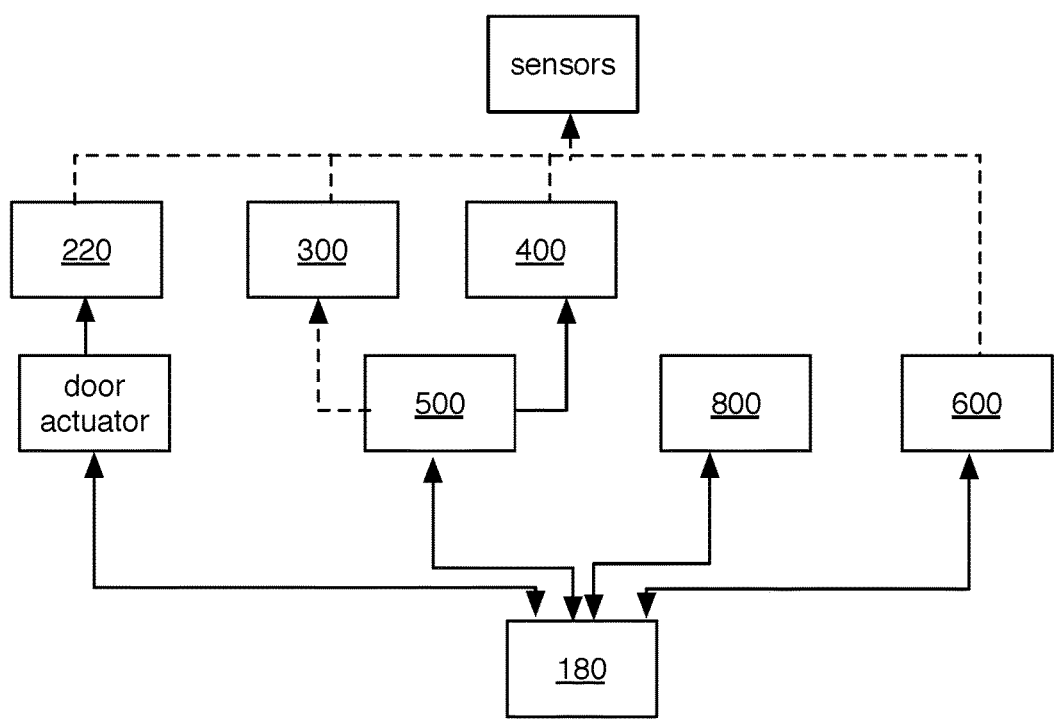
FIG. 10 is a schematic representation of a variation of system control.

As shown in FIG. 10, the system 100 can additionally include a processor 180 that functions to control system operation (e.g., control performance of the method described below). The processor 180 is preferably retained within the housing 200, but can alternatively be arranged external the housing 200. The processor 180 is preferably housed within a waterproof casing, but can alternatively be retained in any other suitable manner. The processor 180 is preferably fluidly and thermally isolated from the blade assembly 400, blade actuator 800, container platform 300, or any other system component, but can alternatively be fluidly and/or thermally connected to one or more system components. For example, the processor 180 can be thermally connected to the container 120 (e.g., arranged along a container 120 retention mechanism connected to the container receptacle 320), such that heat from the processor 180 can be transferred to the container 120, and the container 120 can cool the processor 180.

The processor 180 is preferably connected to the active components of the system 100, such as the active actuators (e.g., platform actuator(s)), the sensors, and the switches of the system 100, but can alternatively be connected to the passive components or be connected to any other suitable component. The processor 180 is preferably electrically connected to the components (e.g., by a wire), but can alternatively or additionally be wirelessly connected to the components. The processor 180 can additionally include a receiver, transmitter, and/or transponder, and can communicate with external computing systems (e.g., a remote server, user device, etc.).

The system 100 can additionally include a power source that functions to power the active components of the system 100. The power source can be a power storage system (e.g., a battery, such as a lithium ion battery, a capacitor, etc.), a power supply (e.g., a plug couplable to a wall outlet), or be any other suitable power supply. The power source is preferably connected to the active components by a set of wired connections, but can alternatively be wirelessly connected or otherwise connected to the components. However the system 100 can include any other suitable component, operable in any other suitable manner.

12. Method

Figure 14:
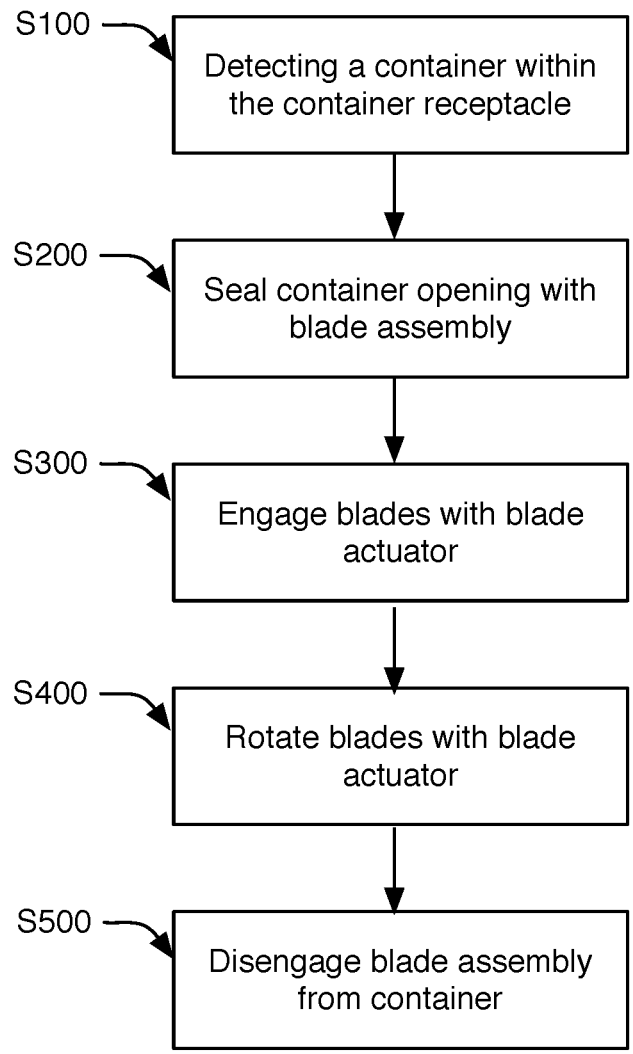
FIG. 14 is a schematic representation of the method.
Figure 15:
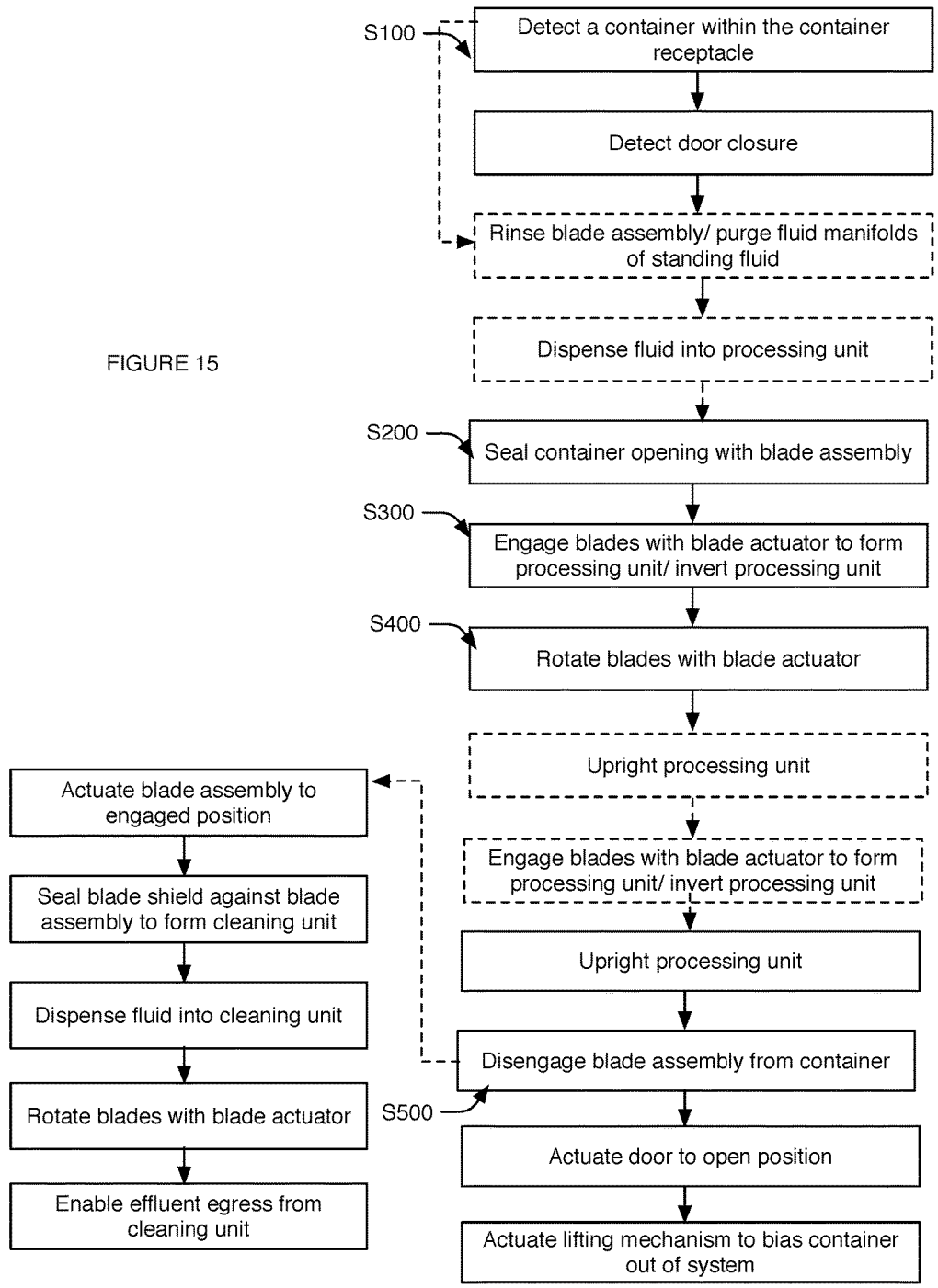
FIG. 15 is a schematic representation of an example of the method.

As shown in FIGS. 11 and 14, a method for processing foodstuff with an automated food processing system includes: detecting the presence of a container within the container receptacle S100; sealing the container opening with the blade assembly S200; engaging the set of blades with a blade actuator S300; rotating the set of blades with the blade actuator S400; and disengaging the blade assembly from the container S500. The method functions to process foodstuff within a processing volume. More preferably, the method functions to blend foodstuff within a container 120. However, the method can process any other suitable foodstuff in any other suitable volume.

All or part of the method is preferably automatically performed, but can alternatively be manually performed, performed in response to the detection of trigger events, or be performed at any other suitable time or frequency. The method is preferably performed by the system 100 discussed above (e.g., controlled by the processor 180), but can alternatively be performed or controlled by a different system, a remote computing system, or any other suitable apparatus, computing system, or set thereof. The method is preferably performed with a container 120 containing foodstuff (e.g., prepackaged with foodstuff), more preferably frozen foodstuff, but can alternatively be performed with any other suitable foodstuff, be performed with a container 120 that receives foodstuff dispensed by the system 100 from a reservoir or hopper, or be performed with any other suitable foodstuff provision system.

Detecting the presence of a container within the container receptacle S100 functions to determine that a container 120 has been received within the container receptacle 320. Detecting the presence of the container 120 can include: receiving the container 120 within the container receptacle 320, recording a measurement indicative of container receipt, and determining that the container 120 has been received based on the measurement. The container 120 is preferably received by the container receptacle 320 of the container platform 300, but can alternatively be received by any other suitable component. The container 120 is preferably received when the container 120 is entirely or partially inserted into the container receptacle 320, but can alternatively be otherwise received. The container platform 300 is preferably in the loading position 302 when the container 120 is received, but can alternatively be in any other suitable position. Recording the measurement indicative of container receipt is preferably performed by the container platform sensor or switch. Example measurements can include detection of a weight or pressure on the lifting mechanism 340 (e.g., detection of a depression force), determination that a laser beam has been interrupted, detection of actuation of the lifting mechanism 340 or a set of container 120 retention mechanisms, or be any other suitable measurement.

Sealing the container opening with the blade assembly S200 functions to form a processing unit 140 (e.g., blending unit), which defines the processing chamber 142 in which the foodstuff will be processed (e.g., blended). The processing unit 140 is preferably cooperatively formed by the container 120, the container platform 300, the blade assembly 400, and/or blade platform 420, but can alternatively or additionally be formed by any other suitable component. The blade recess 426 is preferably substantially aligned with the container opening when sealed, but can alternatively be misaligned or in any other suitable relative orientation. The container opening can be sealed by applying a sealing or other force against the container 120 with the blade assembly 400 and/or platform, but can alternatively be sealed in any other suitable manner. The force can be applied against the container edges forming the container opening, against the container receptacle 320, or applied to any other suitable component. Alternatively or additionally, the method can include orienting the set of blades 440 within the container 120.

The container opening can be sealed in response to a container 120 being present within the container receptacle 320 (e.g., in response to receipt of the container 120, in response to determination that the container 120 is within the container receptacle 320, etc.), in response to the door 220 being in the closed position (e.g., in response to determination that the door 220 is in the closed position based on the sensor data, etc.), in response to a combination thereof, or in response to the occurrence of any other suitable trigger event.

In one variation, sealing the container opening includes: actuating the blade assembly 400 to the disengaged position 424 (e.g., the first position), while the container platform 300 is in the loading position 302; and coupling the blade assembly 400 (more preferably the blade platform 420, but alternatively another component) against the container platform 300. Actuating the blade assembly 400 can include moving the blade platform 420 to the disengaged position 424 (e.g., from the engaged position 422, but alternatively from any other suitable position) with the platform actuator 500, moving a blade platform 420 into the first position over the container platform 300, or otherwise arranging the blade assembly 400 over the container opening. The blade platform 420 is preferably arranged over the container platform 300 in the loading position 302 when sealed, but can alternatively be sealed in any other suitable position. Coupling the blade assembly 400 against the container 120 can include coupling the blade assembly 400 to the container platform 300 with a latching mechanism, a set of complimentary magnetic elements, adhesive, suction (e.g., generated within the processing chamber 142), or include any other suitable method of coupling the blade assembly 400 to the container 120.

Engaging the set of blades with a blade actuator S300 functions to drivably connect the processing unit 140 with the blade actuator 800. The blades are preferably engaged with the blade actuator 800 after the container opening is sealed, but can alternatively be engaged before (e.g., wherein the blade actuator 800 moves with the set of blades 440) or after. Engaging the set of blades 440 with the blade actuator 800 preferably includes actuating the blade assembly 400 to the engaged position 422 and/or the container platform 300 to the processing position 304. As shown in FIG. 12, engaging the set of blades 440 with the blade actuator 800 can additionally include inverting the processing unit 140 (e.g., 150° from the upright position), such that the longitudinal axis of the container 120 is misaligned with a gravity vector, the container base is elevated above the container opening, or the container 120 is otherwise tilted or inverted from the upright position. In one variation, engaging the set of blades 440 with the blade actuator 800 can include moving the blade platform 420, the container 120, and the container platform 300 in unit to a second position, a blade actuator 800 engaging the blender blade in the second position. However, the set of blades 440 can be otherwise engaged with a blade actuator 800.

Rotating the set of blades S400 functions to execute the processing cycle. More preferably, rotating the set of blades 440 functions to execute the blend cycle to blend the foodstuff and/or additives (e.g., water) within the processing unit 140 (e.g., within the container 120) into an emulsion, but can alternatively process the food in any other suitable manner. The blades can be rotated at a predetermined rate, frequency, axial position, or have any other suitable operational parameter controlled. The blade rotation is preferably controlled according to recipe or schema, and is preferably controlled by processor 180 or other computing system. The blades are preferably actuated by the blade actuator 800, but can alternatively be actuated by any other suitable acutation mechanism.

Disengaging the blade assembly from the container S500 functions to reveal the container 120—now with blended contents—to the user for retrieval. The blade assembly 400 is preferably disengaged after rotating the set of blades 440 with the blade actuator 800, but can alternatively be disengaged during blade rotation or at any other suitable time. Disengaging the blade assembly 400 can include: uprighting the blending unit (e.g., moving the blade assembly 400 to the disengaged position 424 and the container platform 300 to the loading position 302), decoupling the blade assembly 400 from the container platform 300, actuating the blade assembly 400 away from the disengaged position 424 (e.g., toward or to the engaged position 422), and retaining the container platform 300 in the loading position 302. However, the blade assembly 400 can be otherwise disengaged from the container 120. Disengaging the blade assembly 400 can additionally include actuating the door 220 to the open position (e.g., with a door 220 actuator), raising the container 120 out of the container receptacle 320 (e.g., with the lifting mechanism 340 or releasing a latch retaining the lifting mechanism 340 in the lowered position), or include any other suitable process. In a specific example, disengaging the blade assembly 400 can include moving the blade platform 420, the container 120, and the container platform 300 in unit to the first position, unlocking the blade platform 420 from the container platform 300, and moving the blade platform 420 into the second position to reveal the container 120 for a consumer, wherein the container platform 300 supports the container 120 in an upright orientation in the first position. Disengaging the blade assembly can additionally include opening a vent to equalize the chamber pressure with the external pressure prior to moving the blade platform 420 into the second position. However, the blade assembly 400 can be otherwise disengaged from the container 120 and/or container platform 300.

The method can additionally include agitating the processing unit S420, which functions to dislodge clumps within the processing chamber 142. The processing unit 140 is preferably agitated during the processing cycle, but can alternatively be agitated before, after, or at any suitable time relative to the processing cycle (e.g., blend cycle). The processing unit 140 can be agitated one or more times. Agitating the processing unit 140 can include shaking the processing unit 140 laterally, shaking the processing unit 140 longitudinally or arcuately, rotating the processing unit 140 in a direction opposing the direction of blade rotation, rotating the blades in the opposing direction, or otherwise agitating fluid flow within the processing chamber 142. In one variation, agitating the blending unit can include, partway through the blend cycle: uprighting the blending unit, inverting the blending unit (and recoupling the blending assembly to the blade actuator 800), and resuming the blend cycle. However, the processing unit 140 can be otherwise agitated.

The method can additionally include adjusting the foodstuff temperature, which functions to melt the foodstuff, bring the foodstuff to a predetermined temperature (e.g., for consumption), and/or facilitate better food processing. Adjusting the foodstuff temperature can include heating the foodstuff, cooling the foodstuff, maintaining the foodstuff temperature, or otherwise adjusting the foodstuff temperature. Adjusting the foodstuff temperature can include introducing heated fluid into the processing chamber 142 (e.g., by adding water via the fluid dispenser 600, etc.), heating the container 120 (e.g., with heating elements thermally coupled to the container receptacle 320), heating the blade assembly 400, or otherwise applying heat to foodstuff. The foodstuff is preferably heated after the blade assembly 400 is sealed against the container opening, but can alternatively be heated before or at any other suitable point in time. Adjusting the foodstuff temperature by introducing water at a predetermined temperature can include: adjusting the amount of fluid introduced into the processing chamber 142 and providing a predetermined volume of fluid into the processing chamber 142, adjusting the temperature to which the fluid is heated, or otherwise adjusting the temperature of the foodstuff.

The method can additionally include cleaning the blade assembly and/or container platform S600, which functions to sterilize, rinse, or otherwise clean the food-contacting portions of the system 100. The food-contacting components can be rinsed, scrubbed, heated above a predetermined temperature, gassed (e.g., with iodine), misted (e.g., with alcohol), or otherwise cleaned. The food-contacting components can be rinsed with the fluid used in or similar to that introduced into the processing chamber 142 to heat the foodstuff, cleaning fluid, or be any other suitable fluid. However, the blade assembly 400 can be otherwise cleaned.

As shown in FIG. 13, one variation of cleaning the blade assembly 400 includes: moving a blade shield 900 into a cleaning position over the blade assembly 400 to envelope the blades to form a cleaning chamber 162; actuating the blade actuator 800 during a clean cycle to rotate the blades; injecting a cleaning fluid toward the blender blade during the clean cycle; and, in response to completion of the clean cycle, retracting the blade shield 900 from the clean position. The blade is preferably in the engaged position 422 as the blade shield 900 moves from the retracted position to the cleaning position, but can alternatively be in any other suitable position. Enveloping the blade assembly 400 can include cooperatively enclosing the blades between the blade platform 420 and the blade shield 900, enclosing the blade recess 426, or otherwise encompassing the blade. The blade assembly 400 can be sealed against the blade shield 900, forced against the blade shield 900 (e.g., by a latch or other coupling mechanism), or otherwise coupled to the blade shield 900. However, the cleaning chamber 162 can be formed and cleaned in any other suitable manner.

The method can additionally include facilitating effluent egress from the cleaning chamber 162, which functions to remove the rinsate from the cleaning chamber 162. This can include opening a valve fluidly connecting the egress manifold 700 with the cleaning chamber 162, decreasing the sealing or coupling force between the blade assembly 400 and container platform 300, or otherwise facilitating fluid flow between the cleaning chamber 162 and a trough 710 or other fluid reservoir. However, the effluent can be otherwise removed.

The systems and methods of the invention can be embodied and/or implemented at least in part as a machine configured to receive a computer-readable medium storing computer-readable instructions. The instructions can be executed by computer-executable components integrated with the application, applet, host, server, network, website, communication service, communication interface, hardware/firmware/software elements of a user computer or mobile device, or any suitable combination thereof. Other systems and methods of the embodiments can be embodied and/or implemented at least in part as a machine configured to receive a computer-readable medium storing computer-readable instructions. The instructions can be executed by computer-executable components integrated by computer-executable components integrated with systems and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component can be a processor 180, though any suitable dedicated hardware device can (alternatively or additionally) execute the instructions.

Although omitted for conciseness, the preferred embodiments include every combination and permutation of the various system components and the various method processes.

As a person skilled in the art will recognize from the previous detailed description and from the figures and claims, modifications and changes can be made to the embodiments of the invention without departing from the scope of this invention as defined in the following claims.

We claim:

1. A method for preparing frozen foodstuff with a system, the frozen foodstuff contained within a container defining a container opening, the method comprising:
   determining receipt of the container within a container receptacle of the system;
   automatically sealing a blade assembly of the system against the container opening to form a blending unit, the blade assembly comprising a set of blades;
   automatically engaging the set of blades with a blade actuator of the system, wherein engaging the set of blades includes inverting the blending unit;
   automatically rotating the set of blades with the blade actuator;
   uprighting the blending unit after automatically rotating the set of blades with the blade actuator; and
   automatically disengaging the blade assembly from the container.

2. The method of claim 1, further comprising automatically agitating the blending unit during automatically rotating the set of blades with the blade actuator.

3. The method of claim 2, wherein rotating the set of blades with the blade actuator comprises blending the foodstuff within the container, wherein agitating the blending unit comprises uprighting, then inverting, the blending unit part way through blending the foodstuff.

4. The method of claim 1, further comprising automatically heating the foodstuff within the container.

5. The method of claim 4, wherein heating the foodstuff within the container comprises automatically introducing liquid at a controlled temperature from a liquid supply into the container prior to automatically rotating the set of blades with the blade actuator.

6. The method of claim 5, further comprising automatically rinsing the set of blades with liquid at the controlled temperature from the liquid source after determination of door actuation of a door of the system to an open position, wherein the controlled temperature is at least 150° F.

7. The method of claim 1, further comprising automatically determining door closure of a door of the system, wherein the blade assembly is automatically sealed against the container opening in response to determination of door closure and container receipt.

8. A method for preparing frozen foodstuff with a system, the method comprising:
   determining receipt of a container comprising a container opening within a container receptacle defined within a container platform, the container platform pivotally connected along a first container platform edge to a system body and operable between a loading position and a processing position distinct from the loading position;
   coupling a blade platform to the container platform, the blade platform supporting a blade assembly including a set of blades, the blade platform pivotally connected along a first blade platform edge to the system body, the blade assembly sealed against the container opening;
   moving the blade platform and the container platform from a disengaged position in which the set of blades is not rotatably coupled to a blade actuator to an engaged position in which the set of blades is rotatably coupled to the blade actuator;
   rotating the set of blades responsive to moving the blade platform and the container platform to the engaged position;
   moving the blade platform and the container platform from the engaged position to the disengaged position; and
   decoupling the blade platform from the container platform.

9. The method of claim 8, wherein coupling the blade platform to the container platform includes sealing a blade assembly supported by the blade platform with the container.

10. The method of claim 8, further comprising moving the blade platform to engage with the container platform responsive to determining receipt of the container within the container receptacle.

11. The method of claim 8, further comprising delivering a fluid into the container via a liquid manifold fluidly connected to the blade chamber defined within the blade platform, the blade chamber partially enclosing the set of blades.

12. The method of claim 8, wherein rotating the set of blades responsive to moving the blade platform and the container platform to the engaged position includes actuating a blade actuator responsive to the blade actuator engaging with a driveshaft rotatably mounting the set of blades to the blade platform.

13. The method of claim 8, further comprising:
    moving the coupled blade platform and the container platform from the engaged position to the disengaged position.

14. The method of claim 8, wherein decoupling the blade platform from the container platform includes moving the blade platform away from the container platform.

15. The method of claim 8, wherein coupling a blade platform to the container platform includes sealing the blade assembly against the container opening.

16. The method of claim 8, further comprising moving, responsive to rotating the set of blades for a predetermined time duration; the blade platform and the container platform from the engaged position towards the disengaged position and moving the blade platform and the container platform back to the engaged position; and
    rotating the set of blades again responsive to moving the blade platform and the container platform back to the engaged position.

* * * * *